(12) United States Patent
Fukuda et al.

(10) Patent No.: US 11,255,353 B2
(45) Date of Patent: Feb. 22, 2022

(54) HYDRAULIC SYSTEM OF WORKING MACHINE

(71) Applicant: KUBOTA CORPORATION, Osaka (JP)

(72) Inventors: Yuji Fukuda, Osaka (JP); Keigo Honda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/185,333

(22) Filed: Feb. 25, 2021

(65) Prior Publication Data

US 2021/0180618 A1 Jun. 17, 2021

Related U.S. Application Data

(60) Division of application No. 16/226,324, filed on Dec. 19, 2018, now Pat. No. 10,968,923, which is a
(Continued)

(30) Foreign Application Priority Data

May 16, 2017 (JP) .............................. JP2017-097651
Sep. 22, 2017 (JP) .............................. JP2017-182585

(51) Int. Cl.
*F15B 11/16* (2006.01)
*E02F 3/42* (2006.01)
(Continued)

(52) U.S. Cl.
CPC ............ *F15B 11/16* (2013.01); *E02F 3/3414* (2013.01); *E02F 3/422* (2013.01); *E02F 9/2225* (2013.01);
(Continued)

(58) Field of Classification Search
CPC ............ F15B 11/16; F15B 2211/40507; F15B 2211/3116; F15B 2211/71; E02F 9/2282
See application file for complete search history.

(56) References Cited

U.S. PATENT DOCUMENTS 3,303,753 A 2/1967 McCay, Jr.
8,607,821 B2 * 12/2013 Miki ...................... F15B 11/16
137/596.17
(Continued)

FOREIGN PATENT DOCUMENTS

JP 1985-096472 U1 7/1985
JP 1986-169166 U1 10/1986
(Continued)

*Primary Examiner* — Dustin T Nguyen
(74) *Attorney, Agent, or Firm* — Greenblum & Bernstein, P.L.C.

(57) ABSTRACT

A hydraulic system includes a hydraulic pump to output an operation fluid, first and second hydraulic devices to be operated by the operation fluid, first and second control valves to control the first and second hydraulic device, respectively, first and second communication tubes connecting the first hydraulic device to the first control valve, a supply fluid tube connecting the first control valve to the second control valve, the supply fluid tube being configured to supply the return fluid to the second control valve, first and second connection fluid tubes disposed on the first control valve, a discharge fluid tube connected to the first control valve, first and second branching fluid tubes branched from the first and second connection fluid tubes, respectively, first and second throttles disposed on the first and second branching fluid tubes, respectively, the second throttle being smaller than the first throttle.

3 Claims, 10 Drawing Sheets

Related U.S. Application Data continuation-in-part of application No. 15/978,729, filed on May 14, 2018.

(51) Int. Cl.
| | | |
|---|---|---|
| *E02F 9/22* | (2006.01) | |
| *E02F 3/34* | (2006.01) | |
| *F15B 13/02* | (2006.01) | |
| *F15B 21/0423* | (2019.01) | |
| *F16K 11/07* | (2006.01) | |
| *F15B 13/04* | (2006.01) | |

(52) U.S. Cl.
CPC ........... *E02F 9/2267* (2013.01); *E02F 9/2271* (2013.01); *E02F 9/2282* (2013.01); *E02F 9/2285* (2013.01); *E02F 9/2292* (2013.01); *F15B 13/024* (2013.01); *F15B 13/027* (2013.01); *F15B 13/0402* (2013.01); *F15B 21/0423* (2019.01); *F15B 2013/0412* (2013.01); *F15B 2211/20523* (2013.01); *F15B 2211/20538* (2013.01); *F15B 2211/30505* (2013.01); *F15B 2211/315* (2013.01); *F15B 2211/3116* (2013.01); *F15B 2211/3122* (2013.01); *F15B 2211/31535* (2013.01); *F15B 2211/40507* (2013.01); *F15B 2211/415* (2013.01); *F15B 2211/45* (2013.01); *F15B 2211/50518* (2013.01); *F15B 2211/5159* (2013.01); *F15B 2211/55* (2013.01); *F15B 2211/565* (2013.01); *F15B 2211/62* (2013.01); *F15B 2211/7054* (2013.01); *F15B 2211/71* (2013.01); *F15B 2211/7128* (2013.01); *F16K 11/07* (2013.01); *F16K 11/0716* (2013.01)

(56) References Cited

U.S. PATENT DOCUMENTS

| | | |
|---|---|---|
| 9,103,096 B2 | 8/2015 | Kondo |
| 9,828,745 B2 | 11/2017 | Ueda et al. |
| 2004/0182233 A1 | 9/2004 | Korogi |
| 2010/0236233 A1 | 9/2010 | Sumiyoshi et al. |
| 2011/0232787 A1 | 9/2011 | Miki |
| 2013/0036729 A1* | 2/2013 | Kinugawa .............. F16H 61/468 60/446 |
| 2013/0318958 A1* | 12/2013 | Coombs .................. F15B 11/16 60/459 |
| 2015/0354605 A1 | 12/2015 | Ueda et al. |

FOREIGN PATENT DOCUMENTS

| | | |
|---|---|---|
| JP | S63219904 A | 9/1988 |
| JP | 2001-099108 A | 4/2001 |
| JP | 2006-076751 A | 3/2003 |
| JP | 2010270527 | 2/2010 |
| JP | 2012-047298 A | 3/2012 |
| JP | 2017089870 A | 5/2017 |

* cited by examiner

HYDRAULIC SYSTEM OF WORKING MACHINE

CROSS-REFERENCE TO RELATED APPLICATION

This application is a Divisional of U.S. patent application Ser. No. 16/226,324, filed Dec. 19, 2018, which is a Continuation-in-part application of U.S. patent application Ser. No. 15/978,729, filed May 14, 2018, which claims priority to Japanese Patent Application No. 2017-182585, filed Sep. 22, 2017, and Japanese Patent Application No. 2017-097651, filed May 16, 2017. The disclosure of each of the above identified applications is hereby incorporated by reference in its entirety as if set forth in full herein.

BACKGROUND OF THE INVENTION

Field of the Invention

The present invention relates to a hydraulic system for a working machine and to a control valve.

Discussion of the Background

Japanese Unexamined Patent Application Publication No. 2010-270527 discloses a hydraulic system for a working machine. The working machine disclosed in Japanese Unexamined Patent Application Publication No. 2010-270527 includes a boom, a bucket, a boom cylinder configured to operate the boom, a bucket cylinder configured to operate the bucket, an auxiliary actuator configured to operate an auxiliary attachment, a first control valve configured to control stretching and shortening of the boom cylinder, a second control valve configured to control stretching and shortening of the bucket cylinder, and a third control valve configured to operate the auxiliary actuator.

SUMMARY OF THE INVENTION

A hydraulic system of a working machine includes a hydraulic pump configured to output an operation fluid, a first hydraulic device configured to be operated by the operation fluid, a second hydraulic device other than the first hydraulic device, the second hydraulic device being configured to be operated by the operation fluid, a first control valve configured to control the first hydraulic device, a second control valve disposed on a downstream side of the first control valve and configured to control the second hydraulic device, a communication tube connecting the first hydraulic device to the first control valve, the communication tube being configured to supply a return fluid that returns from the first hydraulic device to the first control valve, a supply fluid tube connecting the first control valve to the second control valve, the supply fluid tube being configured to supply the return fluid to the second control valve, a connection fluid tube disposed on the first control valve, the connection fluid tube connecting the communication tube to the supply fluid tube, a discharge fluid tube connected to the first control valve, a setting portion disposed on the discharge fluid tube and configured to increase a pressure in the discharge fluid tube, a branching fluid tube branched from the connection fluid tube, the branching fluid tube being connected to the discharge fluid tube, and a throttle disposed on the branching fluid tube.

A hydraulic system of a working machine includes a hydraulic pump configured to output an operation fluid, a first hydraulic device configured to be operated by the operation fluid, a second hydraulic device other than the first hydraulic device, the second hydraulic device being configured to be operated by the operation fluid, a first control valve configured to control the first hydraulic device, a second control valve disposed on a downstream side of the first control valve and configured to control the second hydraulic device, a first communication tube connecting the first hydraulic device to the first control valve, the first communication tube being configured to supply a return fluid that returns from the first hydraulic device to the first control valve, a second communication tube other than the first communication tube, the second communication tube connecting the first hydraulic device to the first control valve and being configured to supply the return fluid that returns from the first hydraulic device to the first control valve, a supply fluid tube connecting the first control valve to the second control valve, the supply fluid tube being configured to supply the return fluid to the second control valve, a first connection fluid tube disposed on the first control valve, the first connection fluid tube connecting the first communication tube to the supply fluid tube, a second connection fluid tube other than the first connection fluid tube, the second connection fluid tube being disposed on the first control valve and connecting the second communication tube to the supply fluid tube, a discharge fluid tube connected to the first control valve, a first branching fluid tube branched from the first connection fluid tube, the first branching fluid tube being connected to the discharge fluid tube, a second branching fluid tube branched from the second connection fluid tube, the second branching fluid tube being connected to the discharge fluid tube, a first throttle disposed on the first branching fluid tube, and a second throttle disposed on the second branching fluid tube, the second throttle being smaller than the first throttle.

A control valve includes a first port to which a first fluid tube is connected, the first fluid tube being connected to a first hydraulic device, a second port to which a second fluid tube is connected, the second fluid tube being connected to the first hydraulic device, a third port to which a third fluid tube is connected, the third fluid tube being connected to a hydraulic pump configured to output an operation fluid, a fourth port to which a first discharge fluid tube is connected, the first discharge fluid tube being configured to discharge the operation fluid, a fifth port configured to discharge the operation fluid to an outside, the operation fluid having passed through the first port or the second port, a main body including a first inner fluid path, a second inner fluid path, a third inner fluid path, a fourth inner fluid path, and a fifth inner fluid path connected to the first port, the second port, the third port, the fourth port, and the fifth port, and a spool configured to move inside the main body to change communicating destinations of the first inner fluid path, the second inner fluid path, the third inner fluid path, the fourth inner fluid path, and the fifth inner fluid path and to move between a communicating position and a neutral position, the communicating position allowing the second inner fluid path and the fifth inner fluid path to be communicated with each other or the first inner fluid path and the fifth inner fluid path to be communicated with each other, the spool including a first communicating portion configured to allow the second inner fluid path and the fourth inner fluid path to be communicated with each other or the first inner fluid path and the fourth inner fluid path to be communicated with each other when positioned between the communicating position and the neutral position.

A hydraulic system of a working machine includes a hydraulic pump configured to output an operation fluid, a first hydraulic actuator, a second hydraulic actuator, a first control valve including an input port into which the operation fluid to be supplied to the first hydraulic actuator is introduced, the first control valve being configured to control the first hydraulic actuator by the operation fluid to be supplied, a second control valve disposed on a downstream side of the first control valve and configured to control the second hydraulic actuator, a first fluid tube configured to connect the first control valve to the second control valve and to supply a return fluid to the second control valve, the return fluid returning from the first hydraulic actuator to the first control valve, a second fluid tube other than the first fluid tube, the second fluid tube being configured to connect the first control valve to the second control valve and to be communicated with the first fluid tube, and a third fluid tube configured to be communicated with the second fluid tube and to return the return fluid of the first fluid tube to the input port.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
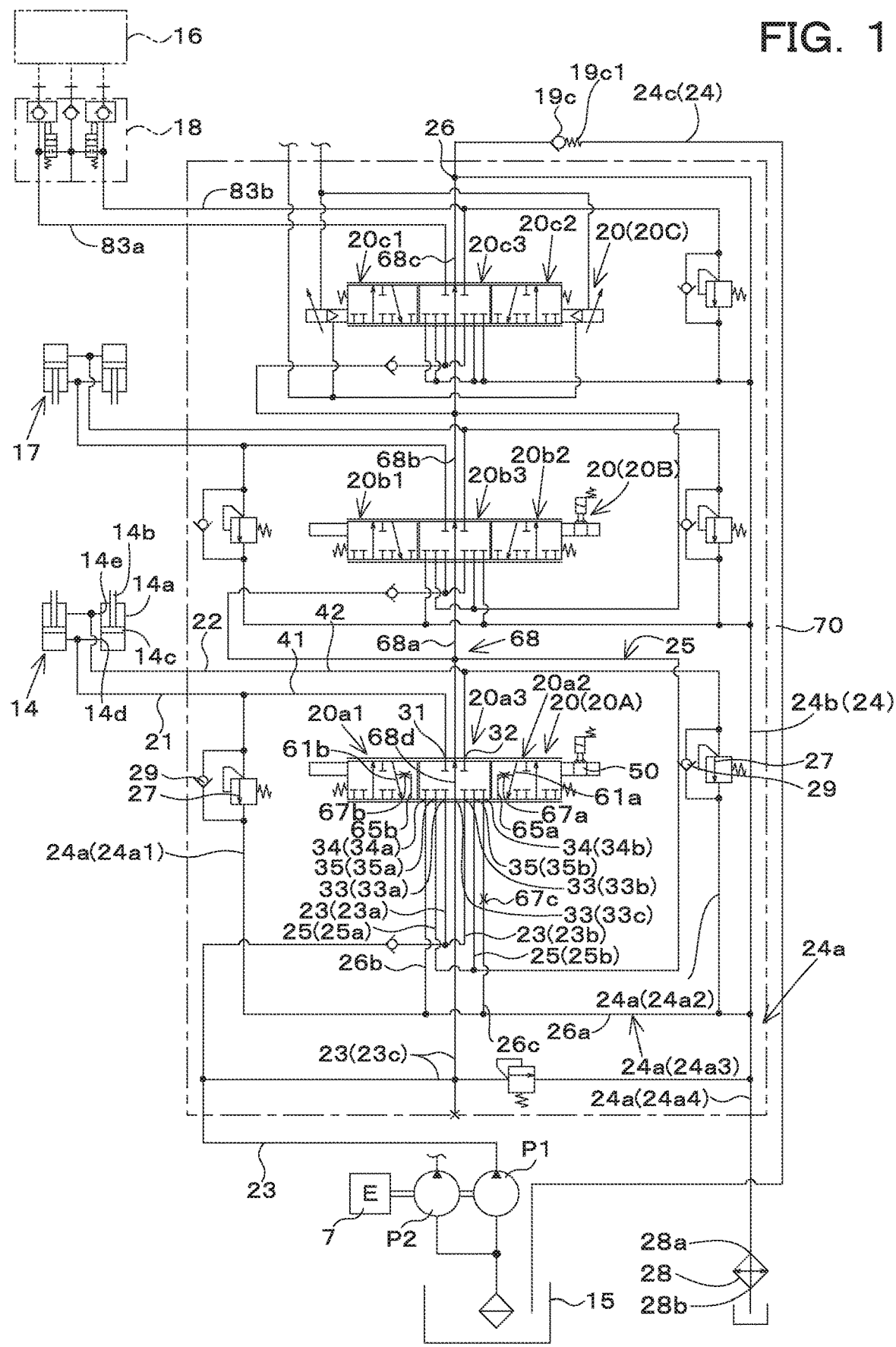
FIG. 1 is a view illustrating a hydraulic system (a hydraulic circuit) according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

First Embodiment

Figure 6:
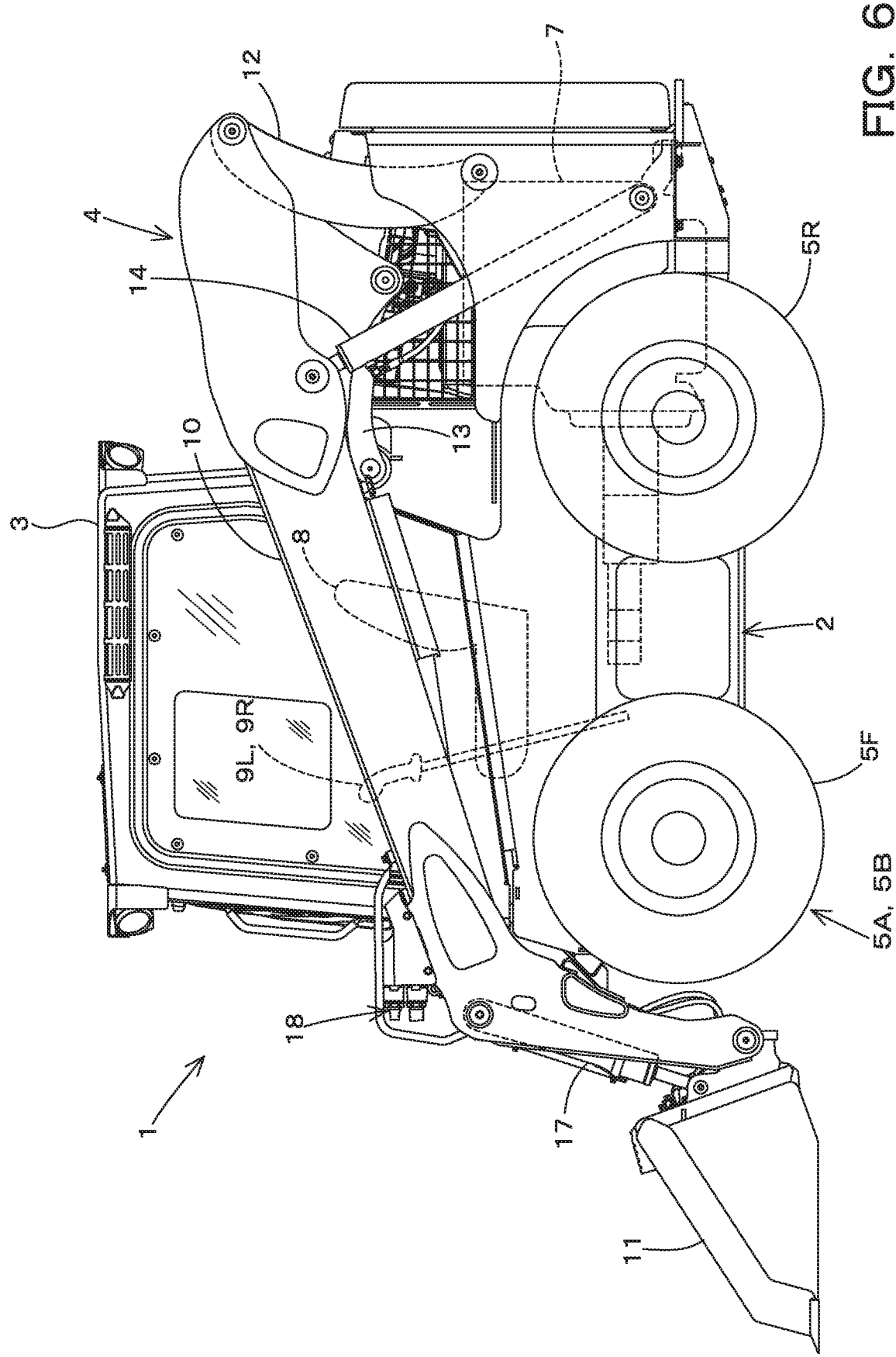
FIG. 6 is a view illustrating a whole of a skid steer loader exemplified as a working machine according to the embodiments.

FIG. 6 shows a side view of a working machine 1 according to embodiments of the present invention. FIG. 6 shows a skid steer loader as an example of the working machine 1. However, the working machine according to the embodiments of the present invention is not limited to the skid steer loader, but may be another kind of the loader working machine such as a compact track loader or the like. Further, the working machine may be another working machine other than the loader work machine.

The working machine 1 includes a machine body (a vehicle body) 2, a cabin 3, a working device 4, a traveling device 5A, and a traveling device 5B.

The cabin 3 is mounted on the machine body 2. An operator seat 8 is disposed at a rear portion of an inside of the cabin 3. In explanations of the embodiments of the present invention, a front side (a left side in FIG. 6) of the operator seated on the operator seat 8 of the working machine 1 is referred to as the front (a front side), a rear side (a right side in FIG. 6) of the operator seated on the operator seat 8 of the working machine 1 is referred to as the rear (a rear side), a left side (a front surface side in FIG. 6) of the operator seated on the operator seat 8 of the working machine 1 is referred to as the left (a left side), and a right side (a back surface side in FIG. 6) of the operator seated on the operator seat 8 of the working machine 1 is referred to as the right (a right side). In addition, a horizontal direction corresponding to a direction perpendicular to the front-to-rear direction will be referred to as a machine width direction. A direction extending from the center portion of the machine body 2 to the right portion or the left portion will be referred to as machine outward. In other words, the machine outward is a machine width direction that corresponds to a direction separating away from the machine body 2. In the explanation, a direction opposite to the machine outward is referred to as a machine inward. In other words, the machine inward is a machine width direction that corresponds to a direction approaching the machine body 2.

The cabin 3 is mounted on the machine body 2. The working device 4 is a device configured to perform a work, and is mounted on the machine body 2. The traveling device 5A is a device configured to allow the machine body 2 to travel, and is disposed on the left side of the machine body 2. The traveling device 5B is a device configured to allow the machine body 2 to travel, and is disposed on the right side of the machine body 2. A prime mover (a motor) 7 is disposed at a rear portion of an inside of the machine body 2. The prime mover 7 is a diesel engine (an engine). Meanwhile, it should be noted that the prime mover 7 is not limited to the engine and may be an electric motor or the like.

On the left side of the operator seat 8, a traveling lever 9L is provided. On the right side of the operator seat 8, a traveling lever 9R is provided. The traveling lever 9L disposed on the left is provided for operating the travel device 5A disposed on the let, and the traveling lever 9R disposed on the right is provided for operating the travel device 5B disposed on the right.

The working device 4 includes a boom 10, a bucket 11, a lift link 12, a control link 13, a boom cylinder (a hydraulic cylinder) 14 and a bucket cylinder 17. The boom 10 is provided on the side of the machine body 2. The bucket 11 is provided on a tip portion (a front end) of the boom 10. The lift link 12 and the control link 13 support a base portion (a rear portion) of the boom 10. The boom cylinder 14 moves the boom 10 upward and downward.

More specifically, the lift link 12, the control link 13, and the boom cylinder 14 are provided on the side of the machine body 2. The upper portion of the lift link 12 is pivotally supported by the upper portion of the base portion of the boom 10. The lower portion of the lift link 12 is pivotally supported on the side portion of the rear portion of the machine body 2. The control link 13 is disposed forward from the lift link 12. One end of the control link 13 is pivotally supported by a lower portion of the base portion of the boom 10, and the other end is pivotally supported by the machine body 2.

The boom cylinder 14 is constituted of a hydraulic cylinder configured to move the boom 10 upward and downward. The upper portion of the boom cylinder 14 is pivotally supported by the front portion of the base portion of the boom 10. The lower portion of the boom cylinder 14 is pivotally supported by the side portion of the rear portion of the machine body 2. When the boom cylinder 14 is stretched and shortened, the boom 10 is swung up and down by the lift link 12 and the control link 13. The bucket cylinder 17 is constituted of a hydraulic cylinder configured to swing the bucket 11.

The bucket cylinder 17 couples the left portion of the bucket 11 and the boom disposed on the left to each other, and couples the right portion of the bucket 11 and the boom disposed on the right to each other. Meanwhile, it should be noted that, instead of the bucket 11, an auxiliary attachment such as a hydraulic crusher, a hydraulic breaker, an angle bloom, an auger, a pallet fork, a sweeper, a mower, a snow blower may be attached to the tip portion (the front portion) of the boom 10.

In the present embodiment, the traveling devices 5A and 5B respectively employ wheeled traveling devices 5A and 5B each having a front wheel 5F and a rear wheel 5R. Meanwhile, traveling devices 5A and 5B of a crawler type (including a semi-crawler type) may be employed as the traveling devices 5A and 5B.

Next, a working-system hydraulic circuit (a working-system hydraulic system) disposed in the skid steer loader 1 will be described below.

As shown in FIG. 1, the working-system hydraulic system is a system configured to operate the boom 10, the bucket 11, the auxiliary attachment, and the like. And, the working-system hydraulic system includes a control valve unit 70 and a hydraulic pump of working system (a first hydraulic pump) P1. In addition, the working-system hydraulic system includes a second hydraulic pump P2 different from the first hydraulic pump P1.

The first hydraulic pump P1 is a pump configured to be operated by the power of the prime mover 7, and is constituted of a gear pump of constant-displacement type (a constant-displacement type gear pump). The first hydraulic pump P1 is configured to output an operation fluid (a hydraulic oil) stored in a tank (an operation fluid tank) 15. The second hydraulic pump P2 is a pump configured to be operated by the power of the prime mover 7, and is constituted of a gear pump of constant-displacement type (a constant-displacement type gear pump). The second hydraulic pump P2 is configured to output the operation fluid stored in the tank (the operation fluid tank) 15.

Meanwhile, in the hydraulic system, the second hydraulic pump P2 is configured to output the hydraulic fluid for signals (a signal hydraulic fluid) and the hydraulic fluid for control (a control hydraulic fluid). Each of the hydraulic fluid for signals (the signal hydraulic fluid) and the hydraulic fluid for control (the control hydraulic fluid) is referred to as a pilot fluid (a pilot oil).

The control valve unit 70 includes a plurality of control valves 20. The plurality of control valves 20 are valves configured to control hydraulic actuators (hydraulic devices) of various types, the hydraulic actuators being disposed on the working machine 1. The hydraulic actuator is a device configured to be operated by the hydraulic fluid, for example, a hydraulic cylinder, a hydraulic motor, and the like. In the embodiment, the plurality of control valves 20 include a first control valve 20A, a second control valve 20B, and a third control valve 20C.

Firstly, the second control valve 20B and the third control valve 20C will be described below.

The second control valve 20B is a valve configured to control a hydraulic cylinder (a bucket cylinder) 17 that is configured to control the bucket 11. In other words, the second control valve 20B is a valve configured to control the bucket cylinder 17 that is a second hydraulic device configured to be operated by the hydraulic fluid. The third control valve 20C is a valve configured to control the hydraulic actuators (the hydraulic cylinder, the hydraulic motor, and the like) 16 mounted on the auxiliary attachment.

The second control valve 20B is a three-position switching valve having a spool directly acting with a pilot fluid (referred to as a pilot direct-acting spool type three-position switching valve). The second control valve 20B is configured to be switched to a neutral position 20b3, to a first position 20b1 other than the neutral position 20b3, and to a second position 20b2 other than the neutral position 20b3 and the first position 20b1. In the second control valve 20B, the switching between the neutral position 20b3, the first position 20b1, and the second position 20b2 is performed by a spool moved by operation of the operation member. A bucket cylinder 17 is connected to the second control valve 20B by a fluid tube.

Thus, when the second control valve 20B is set to the first position 20b1 by the operation of the operating member, the bucket cylinder 17 is shortened. When the bucket cylinder 17 is shortened, the bucket 11 performs a shoveling operation. When the second control valve 20B is set to the second position 20b2 by the operation of the operating member, the bucket cylinder 17 is stretched. When the bucket cylinder 17 is stretched, the bucket 11 performs a dumping operation.

Meanwhile, the switching of the second control valve 20B is performed by directly moving the spool with the operating member. However, the spool may be moved by the pressure of the operation fluid (the pilot fluid). The second control valve 20B is connected to the first control valve 20A by a central fluid tube 68a. The second control valve 20B and the third control valve 20C are connected each other by a central fluid tube 68b. When the second control valve 20B is in the neutral position 20B3, the operation fluid supplied to the second control valve 20B is supplied to the third control valve 20C through the central fluid tube 68b.

The third control valve 20C is a three-position switching valve having a spool directly acting with a pilot fluid (referred to as a pilot direct-acting spool type three-position switching valve). The third control valve 20C is configured to be switched to a neutral position 20C3, to a first position 20C1 other than the neutral position 20C3, and to a second position 20C2 other than the neutral position 20C3 and the first position 20C1. In the third control valve 20C, the switching between the neutral position 20C3, the first position 20C1, and the second position 20C2 is performed by a spool moved by a pressure of the pilot fluid.

A connecting member 18 is connected to the third control valve 20C through supply/discharge fluid tubes 83a and 83b. The supply/discharge fluid tubes 83a and 83b include a first fluid supply/discharge fluid tube 83a and a second fluid supply/discharge fluid tube 83b. A fluid tube connected to the hydraulic actuator 16 of the auxiliary attachment is connected to the connecting member 18.

Thus, when the third control valve 20C is set to the first position 20C1, the operation fluid can be supplied from the first fluid supply/discharge fluid tube 83a to the hydraulic actuator 16 of the auxiliary attachment. When the third control valve 20C is set to the second position 20C2, the operation fluid can be supplied from the second fluid supply/discharge fluid tube 83b to the hydraulic actuator 16 of the auxiliary attachment.

In this manner, when the operation fluid is supplied to the hydraulic actuator 16 from the supply/discharge fluid tube 83a or the supply/discharge fluid tube 83b, the hydraulic actuator 16 (the auxiliary attachment) can be operated. Meanwhile, when the third control valve 20C is in the neutral position 20C3, the hydraulic fluid supplied from the central fluid tube 68b to the third control valve 20C is discharged from the central fluid tube 68c connected to the third control valve 20C.

Next, the first control valve will be described below.

As shown in FIG. 1, the first control valve 20A is a valve configured to be applied to a series circuit. In the series circuit having a control valve on the upstream side (for example, the first control valve 20A) and a control valve on the downstream side (for example, the second control valve 20B), the operation fluid (a return fluid) returning from the hydraulic actuator to the first control valve 20A in the operation of the first control valve 20A flows to the second control valve 20B. The first control valve 20A is a valve configured to output a part of the return fluid to a fluid tube configured to discharge the operation fluid, the return fluid returning from the hydraulic actuator in the operation.

In the present embodiment, the first control valve 20A is connected by to a fluid tube a hydraulic cylinder (a boom cylinder) 14 that is one of the hydraulic actuators. In other words, the first control valve 20A is a valve configured to control the boom cylinder 14 that is the first hydraulic device configured to be activated by the hydraulic fluid. In addition, the first control valve 20A discharges the hydraulic fluid to a fourth fluid tube (a discharge fluid tube) 24 described later, the operation fluid returning from the boom cylinder 14.

The boom cylinder 14 includes a cylindrical body 14a, a rod 14b movably provided on the cylindrical body 14a, and a piston 14c provided on the rod 14b. The boom cylinder 14 and the first control valve 20A are connected each other by communication tubes 21 and 22. The communication tubes 21 and 22 have a first fluid tube (a first communication tube) 21 and a second fluid tube (second communication tube) 22.

In other words, the first fluid tube (the first communication tube) 21 is a fluid tube in which the return fluid from the boom cylinder 14 flows, the return fluid being outputted at the time of shortening of the boom cylinder 14 that is the first hydraulic device. In addition, the second fluid tube (the second communication tube) 22 is a fluid tube in which the return fluid from the boom cylinder 14 flows, the return fluid being outputted at the time of stretching of the boom cylinder 14 that is the first hydraulic device. Each of the first fluid tube 21 and the second fluid tube 22 is configured to supply the operation fluid and is constituted of a tubular member such as a hydraulic hose, a pipe, a coupler, and a joint.

A first supply/discharge port 14d for supplying and discharging the operation fluid is provided on a base end portion (on a side opposite to the rod 14b side) of the cylindrical body 14a. A second supply/discharge port 14e for supplying and discharging the operation fluid is provided on a tip end portion (on the rod 14b side) of the cylindrical body 14a. When the boom cylinder 14 is shortened, the boom cylinder 14 discharges the operation fluid from the first supply/discharge port 14d. When the boom cylinder 14 is stretched, the boom cylinder 14 discharges the operation fluid from the second supply/discharge port 14e.

One end of the first fluid tube 21 is connected to the first supply/discharge port 14d, and one end of the second fluid tube 22 is connected to the second supply/discharge port 14e. That is, the second fluid tube 22 is a fluid tube connected to the boom cylinder 14 at a position different from the first fluid tube 21 that is connected to the boom cylinder 14.

As shown in FIG. 1, the first control valve 20A is a three-position switching valve having a spool directly acting with a pilot fluid (referred to as a pilot direct-acting spool type three-position switching valve). The first control valve 20A is configured to be switched to a neutral position 20a3, to a first position 20a1 other than the neutral position 20a3, and to a second position 20a2 other than the neutral position 20a3 and the first position 20a1.

The first control valve 20A has a plurality of ports. As shown in FIG. 1, the plurality of ports include a first port 31, a second port 32, a third port 33, a fourth port 34, and a fifth port 35.

The first port 31 is a port configured to be connected to the other end of the first fluid tube 21 that is connected to the boom cylinder 14. Thus, the operation fluid flowing from the first port 31 toward the boom cylinder 14 passes through the first fluid tube 21, and then enters the first supply/discharge port 14d of the boom cylinder 14. In addition, the operation fluid flowing from the first supply/discharge port 14d toward the first control valve 20A passes through the first fluid tube 21, and then enters the first port 31.

The second port 32 is a port configured to be connected to the other end of the second fluid tube 22 that is connected to the boom cylinder 14. Thus, the operation fluid flowing from the second port 32 toward the boom cylinder 14 passes through the second fluid tube 22, and then enters the second supply/discharge port 14e of the boom cylinder 14. In addition, the operation fluid flowing from the second supply/discharge port 14e toward the first control valve 20A passes through the second fluid tube 22, and then enters the second port 32.

The third port 33 is a port configured to be connected to a third fluid tube (a main fluid tube) 23 that is connected to the first hydraulic pump P configured to discharge the operation fluid. In particular, the third fluid tube 23 is branched into three tubes at the middle portion of the third fluid tube 23. And, a first branched fluid tube 23a, a second branched fluid tube 23b, and a third branched fluid tube 23c are connected to the third port 33.

That is, the third port 33 includes a port 33a connected to the first branched fluid tube 23a, a port 33b connected to the second branched fluid tube 23b, and a port 33c connected to the third branched fluid tube 23c.

The fourth port 34 is a port configured to be connected to a fourth fluid tube (a discharge fluid tube) 24 that is connected to the operation fluid tank 15. In particular, the fourth fluid tube 24 includes a fluid tube 24a. The fluid tube 24a is a fluid tube configured to supply the operation fluid to the operation fluid tank 15, the operation fluid having passed through the first control valve 20A.

The discharge fluid tube 24a includes a first discharge portion 24a1 connected to the first fluid tube 21, a second discharge portion 24a2 connected to the second fluid tube 22, a third discharge portion 24a3 connecting the first discharge portion 24a1 and the second discharge portion 24a2 to each other, and a fourth discharge portion 24a4 connecting the third discharge portion 24a3 and the operation fluid tank 15 to each other.

Here, the fluid tube including the third discharge portion 24a3 and the fourth discharge portion 24a4 may be respectively referred to as first discharge fluid tubes 24a3 and 24a4. In addition, the discharge fluid tube 24 includes a second discharge fluid tube 24b. The second discharge fluid tube 24b is a fluid tube branched from an output fluid tube 68 and configured to supply, to the fluid tube 24a, the operation fluid having passed through the second control valve 20B and the operation fluid having passed through the third control valve 20C. The second discharge fluid tube 24b is a fluid tube connected to the first discharge fluid tube 24a3.

A relief valve 27 is connected to the first discharge portion 24a1, and another relief valve 27 is connected to the second discharge portion 24a2. In addition, the first discharge portion 24a1 is provided with a bypass fluid tube, and the second discharge portion 24a2 is provided with a bypass fluid tube, the bypass fluid tubes connecting both sides of each of the relief valves 27 to each other. And, a check valve 29 is provided in the bypass fluid tube. The check valve 29 is a valve configured to allow the operation fluid to flow from the discharge fluid tube 24 side to the communication tubes (the first communication tube 21 and the second communication tube 22) and to block the operation fluid so as not to flow from the communication tubes to the discharge fluid tube 24 side.

The fourth discharge portion 24a4 is connected to the second discharge fluid tube 24b. The third discharge portion 24a3 includes a connecting portion 26a and branched discharging portions 26b and 26c. The connecting portion 26a connects the first discharging portion 24a1 and the second discharging portion 24a2 to each other. The branched discharging portions 26b and 26c are branched from the connecting portion 26a into at least two portions. The branched discharging portions 26b and 26c are connected to the fourth port 34 of the first control valve 20A.

That is, the fourth port 34 includes a port 34a and a port 34b. The port 34a is connected to the branched discharge portion 26b, and the port 34b is connected to the branched discharge portion 26c. In the present embodiment, the fourth port 34 is a port including two ports 34a and 34b. However, the number of ports is not limited, and for example, the number of ports may be one.

The fifth port 35 is a port configured to discharge, to the outside, the operation fluid having passed through the first port 31 or the second port 32. That is, the fifth port 35 is a port configured to discharge, to a control valve on the downstream side (the second control valve 20B), the hydraulic fluid (the return fluid) returning from the boom cylinder 14 to the first port 31 or the hydraulic fluid (the returned fluid) returning from the boom cylinder 14 to the second port 32.

Now, the working-system hydraulic system is provided with a fifth fluid tube 25. The fifth fluid tube 25 is a fluid tube configured to supply the return fluid to the second control valve 20B when the first control valve 20A is in operation (when the spool 50 of the first control valve 20A moves).

In particular, when the first control valve 20A is in the first position 20a1, the first control valve 20A and the second control valve 20B are connected to each other by a fifth fluid tube (a supply fluid tube) 25. The fifth fluid tube 25 allows the return fluid to pass through the first control valve 20A, the return fluid returning from the first hydraulic actuator 14 to the first control valve 20A through the first fluid tube 21, and then supplies the return fluid to the second control valve 20B.

One end of the fifth fluid tube 25 is branched into two portions, and the first supply fluid tube 25a (one of the two portions of the branched fluid tube) and the second supply fluid tube 25b (the other one of the two portions of the branched fluid tube) are connected to the fifth port 35. That is, the fifth port 35 includes a port 35a and a port 35b. The port 35 is connected to the first supply fluid tube 25a. And, the port 35b is connected to the second supply fluid tube 25b.

In the present embodiment, the fifth port 35 is a port including two ports 35a and 35b. However, the number of ports is not limited, and for example, the number of ports may be one.

In addition, when the first control valve 20A is in the second position 20a2, the first fluid tube 21 and the fifth fluid tube 25 are connected to each other by the first connection fluid tube 61a. The first connection fluid tube 61a is also referred to as a connection fluid tube. The first connection fluid tube 61a is a fluid tube disposed on the first control valve 20A and is communicated with the first fluid tube 21.

In particular, the first connection fluid tube 61a is a fluid tube configured to connect the first port 31 of the first control valve 20A to the fifth port 35 of the first control valve 20A when the first control valve 20A is set to the second position 20a2.

The working-system hydraulic system includes a branched fluid tube (a first branched fluid tube) 65a that is branched from the first connection fluid tube 61a and configured to discharge the return fluid. The first branched fluid tube 65a is a fluid tube branched from the first connection fluid tube 61a and configured to be communicated with the port 34a when the first control valve 20A is in the second position 20a2. A throttle portion (a first throttle portion) 67a is disposed on the first branched fluid tube 65a, the throttle portion being configured to reduce a flow rate of the operation fluid.

The first throttle portion 67a is constituted, for example, by making one portion of the first branched fluid tube 65a narrower than the other portions of the first branched fluid tube 65a. In other words, the first throttle portion 67a is constituted by reducing a cross-sectional area of the one portion to be smaller than the other portion in the first branched fluid tube 65a where the operation fluid flows. Meanwhile, the configuration of the first throttle portion 67a is not limited to the example described above.

On the other hand, when the first control valve 20A is in the first position 20a1, the second fluid tube 22 and the fifth fluid tube 25 are connected to each other by the second internal fluid tube (a second connection fluid tube) 61b. The second connection fluid tube 61b is also referred to as a connection fluid tube. The second connection fluid tube 61b is a fluid tube disposed on the first control valve 20A and communicated with the second fluid tube 22. The second connection fluid tube 61b is a fluid tube configured to be connect the second port 32 of the first control valve 20A to the fifth port 35 of the first control valve 20A When the first control valve 20A is set to the first position 20a1.

Meanwhile, the working-system hydraulic system has a branched fluid tube (a second branched fluid tube) 65b that is branched off from the second connection fluid tube 61b and configured to discharge the return fluid. In particular, the second branched fluid tube 65b is a fluid tube that is branched off from the second connection fluid tube 61b and is configured to be communicated with the port 34b when the first control valve 20A is in the first position 20a1. The second branched fluid tube 65b is provided with a throttle portion (a second throttle portion) 67b configured to reduce a flow rate of the operation fluid.

The second throttle portion 67b is constituted, for example, by making one portion of the second branched fluid tube 65b narrower than the other portions of the second branched fluid tube 65b. In other words, the second throttle portion 67b is constituted by reducing a cross-sectional area of the one portion to be smaller than the other portion in the second branched fluid tube 65b where the operation fluid flows. Meanwhile, the configuration of the second throttle portion 67b is not limited to the example described above.

In addition, the working-system hydraulic system has a setting portion configured to increase a pressure of the discharge fluid tube 24 connected to the first branched fluid tube 65a or to the second branched fluid tube 65b.

As shown in FIG. 1, the setting portion includes a check valve (a first check valve) 19c and an oil cooler (a fluid cooler) 28, the check valve 19c being constituted of an operation valve. The check valve 19c is provided in the middle of the third discharge fluid tube 24c that is communicated with the output fluid tube 68 (the central fluid tube 68a, the central fluid tube 68b, and the central fluid tube 68c). The check valve 19c is a valve configured to allow the hydraulic fluid to flow toward the hydraulic fluid tank 22 and to prevents the hydraulic fluid from flowing toward the discharge fluid tube 68. The check valve 19c has a setting member 19c1 configured to set a differential pressure.

The setting member 19c1 is constituted of a spring or the like, and is configured to generate a differential pressure by the valve body pushed with a predetermined biasing force from a side opposite to a direction allowing the flow of the hydraulic fluid (from a direction preventing the flow). The oil cooler 28 is provided in the middle of the first discharge fluid tubes 24a3 and 24a4 that are connected to the second discharge fluid tube 24b. The hydraulic fluid discharged from the first discharge fluid tubes 24a3 and 24a4 flows into an inlet port 28a of the oil cooler 28.

The discharge port 28b, which is different from the inlet port 28a of the oil cooler 28, is connected to the operation fluid tank 15. Here, paying attention to the second discharge fluid tube 24b and the third discharge fluid tube 24c provided with the check valve 19c, the third discharge fluid tube 24c and the second discharge fluid tube 24b are connected to each other by the connecting portion 26. The check valve 19c allows the hydraulic fluid to flow from the second discharge fluid tube 24b toward the third discharge fluid tube 24c, and blocks the operation fluid flowing from the third discharge fluid tube 24c to the second discharge fluid tube 24b.

Thus, in the section between the check valve 19c and the connecting section 26 and in the section between the connecting section 26 and the inlet port 28a of the oil cooler 28, the pressure of the hydraulic fluid is increased by the check valve 19c serving as the setting portion. In this manner, when an amount of the operation fluid supplied to the fifth fluid tube (a supply fluid tube) 25 decreases, for example, the operation fluid in the second discharge fluid tube 24b and the first discharge fluid tubes 24a3 and 24a4 can be supplied to the fifth fluid tube 25 through the branched fluid tubes 65a and 65b and the connection fluid tubes 61a and 61b.

For example, in the case where the boom cylinder 14 is stretched (the boom 10 is moved upward), the operation fluid (the return fluid) is supplied to the fifth fluid tube 25 through the second communication tube 22, the second port 32, and the second connection fluid tube 61b.

Here, in the case where the bucket cylinder 17 is stretched (the bucket 11 is dumped) under the state where the boom 10 is moved upward, a relatively large amount of operation fluid is required. However, the operation fluid in the second discharge fluid tube 24b and in the first discharge fluid tubes 24a3 and 24a4 can be supplied to the fifth fluid tube 25 through the branched fluid tube 65b and the connection fluid tube 61b. That is, it is possible to smoothly perform an operation of dumping the bucket 11 with the boom 10 being moved upward.

Figure 2:
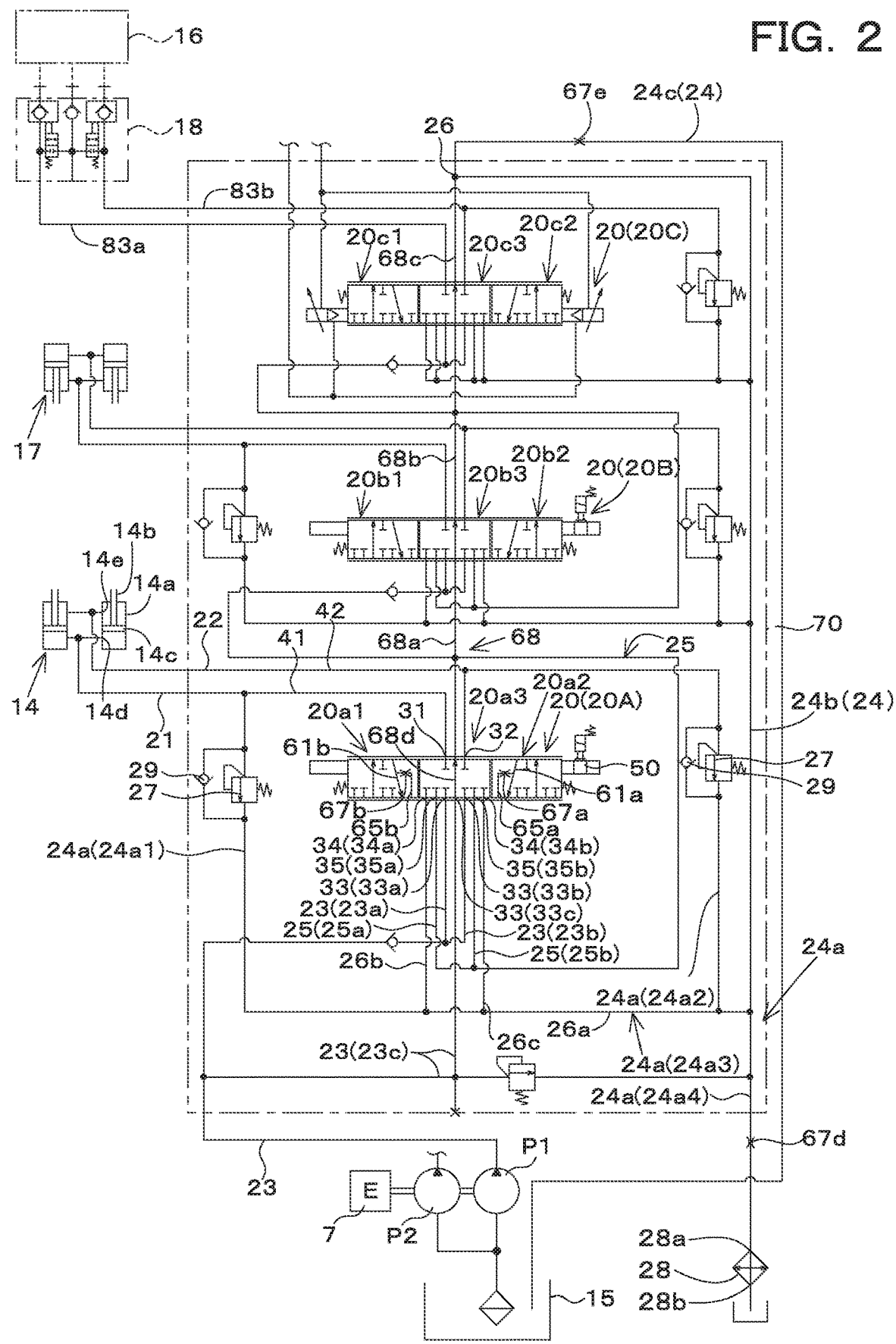
FIG. 2 is a view illustrating a modified example of the hydraulic system (the hydraulic circuit) according to the first embodiment.

FIG. 2 shows a modified example of the setting portion. As shown in FIG. 2, the setting portion includes a throttle 67d and a throttle 67e, the throttle 67d being provided in the fourth discharge portion 244, the throttle 67e being provided in the third discharge fluid tube 24c.

The hydraulic system of the working machine described above has the setting portions (a throttle 67d and a throttle 67e) configured to increase the pressures of the discharge fluid tubes (the branched discharge portions 26b and 26c of the first discharge fluid tube 24a3) that are communicated with the branched fluid tubes (the first branched fluid tube 65a and the second branched fluid tube 65b) branched from the connection fluid tubes (the first connection fluid tube 61a and the second connection fluid tube 61b).

In this manner, the pressure in the section between the ports 34a and 34b and the setting portion (the throttle 67d and the throttle 67e) can be increased in the branched discharge portions 26b and 26c. Thus, in the case where the operation fluid supplied to the fifth fluid tube (the supply fluid tube) 25 is for example reduced, it is possible to supply the hydraulic fluid of the branched discharge portions 26b and 26c to the fifth fluid tube through the branched fluid tubes 65a and 65b and the connection fluid tubes 61a and 61b.

In the embodiment described above, the branched fluid tubes 65a and 65b are provided respectively corresponding to the first position 20a1 and the second position 20a2 of the first control valve 20A. However, it is also possible to provide the branched fluid tube 65b corresponding only to the first position 20a1 and to supply the operation fluid of the discharge fluid tube 24 to the branched fluid tube 65b.

In addition, it is preferred that the setting portion is configured to increase a pressure in the discharge fluid tube 24, and the setting portion may be a relief valve provided in the fourth discharge portion 24a4 and the third discharge fluid tube 24c.

In addition, in the present embodiment, the discharge fluid tube 24 has two fluid tubes, that is, the second discharge fluid tube 24b and the third discharge fluid tube 24c, However, when the second discharge fluid tube 24b and the third discharge fluid tube 24c are collectively constituted of a single fluid tube, the setting portion may be constituted of the oil cooler 28 and the check valve 19c provided in the middle portion of the fluid tube.

Meanwhile, the setting portion may be the oil cooler 28, the check valve 19c, a throttle, or a relief valve, or may be a combination thereof.

Meanwhile, a portion where the operation fluid flows of the second throttle portion 67b has a cross-sectional area smaller than that of the first throttle portion 67a. In other words, the second throttle portion 67b through which the return fluid flows in the stretching of the boom cylinder 14 has a cross-sectional area smaller than that of the first throttle portion 67a through which the return fluid flows when the boom cylinder 14 is shortened, at a portion through which the return fluid flows.

That is, the second throttle portion 67b has a better throttle effect, and the first diaphragm 67a has a throttle effect less than that of the second diaphragm 67b. Thus, the flow rate of the hydraulic fluid supplied to the fifth fluid tube 25 under a condition where the first control valve 20A is set to the first position 20a can be substantially equivalent to the flow rate of the operation fluid supplied to the fifth fluid tube 25 under a condition where the first control valve 20A is set to the second position 20a2.

Orthogonal cross sections (the cross sections in a direction orthogonal to the rod 14) of the rod 14b and the piston 14c in the boom cylinder 14 will be considered below. Regarding the orthogonal cross sections, the cross-sectional area of the piston 14c is larger than the cross-sectional area of the rod 14b. Thus, when the boom cylinder 14 is shortened, an amount of the operation fluid discharged from the first supply/discharge port 14d is larger than an amount of the operation fluid discharged when the boom cylinder 14 is stretched.

That is, when the boom cylinder 14 is shortened, the amount of the operation fluid returning to the first fluid tube 21 and the first port 31 (the amount of the return fluid) will be large. Conventionally, since the return fluid is supplied directly to the second control valve 20B, the operability of the hydraulic actuator (the bucket cylinder 17) operated by the second control valve 20B is lowered when the second control valve 20B is operated simultaneously with the first control valve 20A.

That is, the operation feeling is different when the first control valve 20A and the second control valve 20B are simultaneously operated from when the operation is not performed simultaneously. On the other hand, according to the first control valve 20A, since the cross-sectional area of the second throttle portion 67b is smaller than the cross-sectional area of the first throttle portion 67a, the operation feeling of the hydraulic actuator (the bucket cylinder 17) can be kept unchanged regardless of the stretching and shortening of the boom cylinder 14.

In particular, when the boom cylinder 14 is stretched (moving the boom 10 upward), the operation fluid (the return fluid) discharged from the second supply/discharge port 4e will be less than the operation fluid (the return fluid) discharged from the first supply/discharge port 14d due to the area ratio between the cross sections of the rod 14b and the piston 14c of the cylinder 14 (the cross section in the direction orthogonal to the rod 14).

In addition, when the bucket cylinder 17 is stretched (the bucket 11 is dumped), an external force is applied in a direction to stretch the bucket cylinder 17 due to the loading on the bucket 11 or the like. In this manner, the pressure in the fifth fluid tube 25 will be lower than that in the connection portion 26 and that in the inlet port 28a, and thus the fluid in the third discharge portion 24a3 flows to the second branched fluid tube 65b without returning to the tank 15.

Note that a configuration similar to the configuration of the first throttle portion 67a and the second throttle portion 67b in the present embodiment can also be applied to the second control valve 20B. In that case, the throttle portion through which the return fluid flows when the bucket cylinder 17 is stretched has a cross-sectional area smaller than that of the throttle portion through which the return fluid flows when the bucket cylinder 17 is shortened, in the portion through which the return fluid flows.

Second Embodiment

Figure 3:
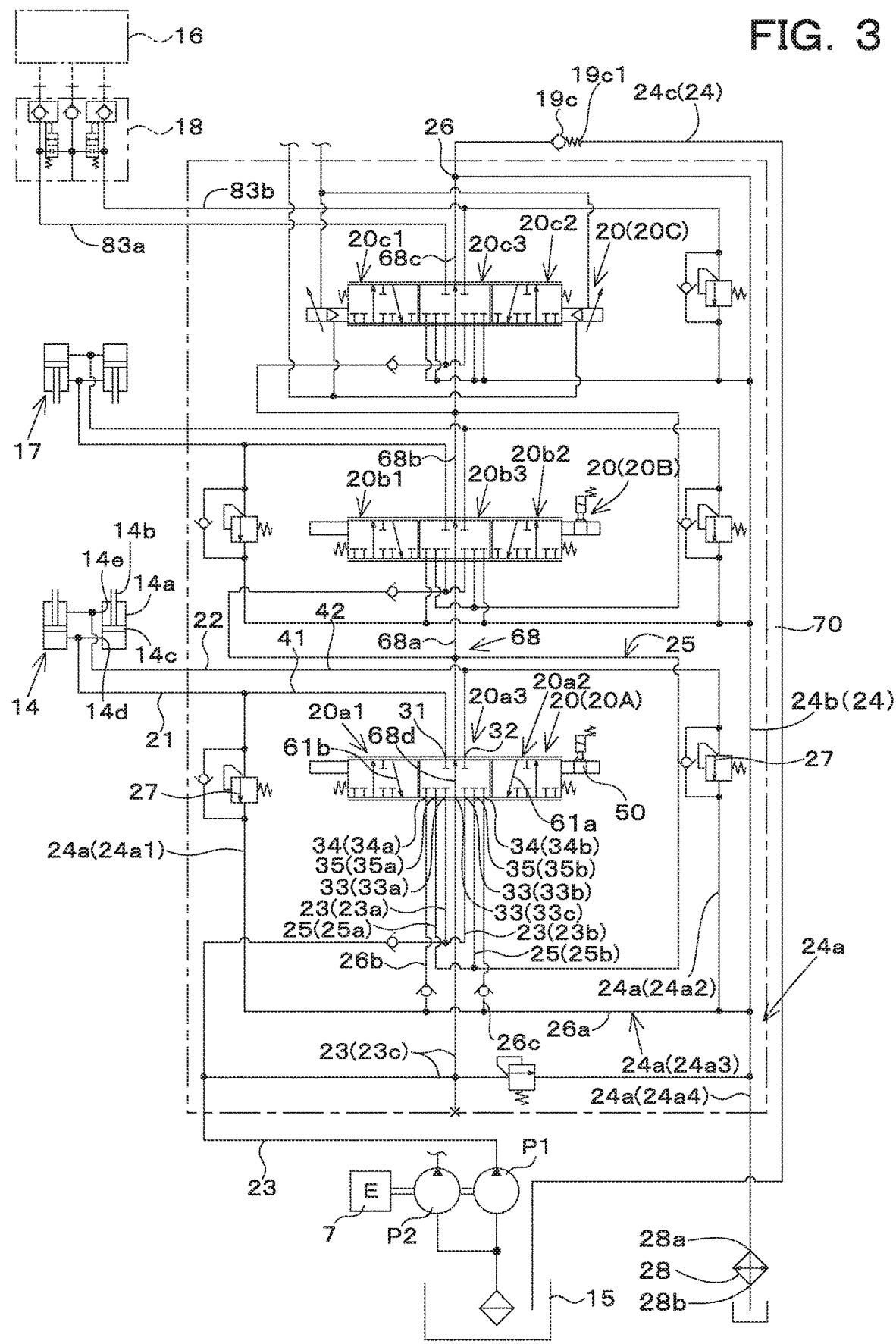
FIG. 3 is a view illustrating a hydraulic system (a hydraulic circuit) according to a second embodiment of the present invention.

FIG. 3 shows a second embodiment of the control valve 20 according to the present invention. The control valve 20 of the second embodiment can be applied to the control valve 20 of the first embodiment described above. Meanwhile, the explanation of the configurations similar to the configurations of the first embodiment will be omitted. As shown in FIG. 3, the hydraulic system of the working machine is a system in which the first branched fluid tube 65a, the second branched fluid tube 65b, and the setting portion (the operation valve) are not included.

Figure 4A:
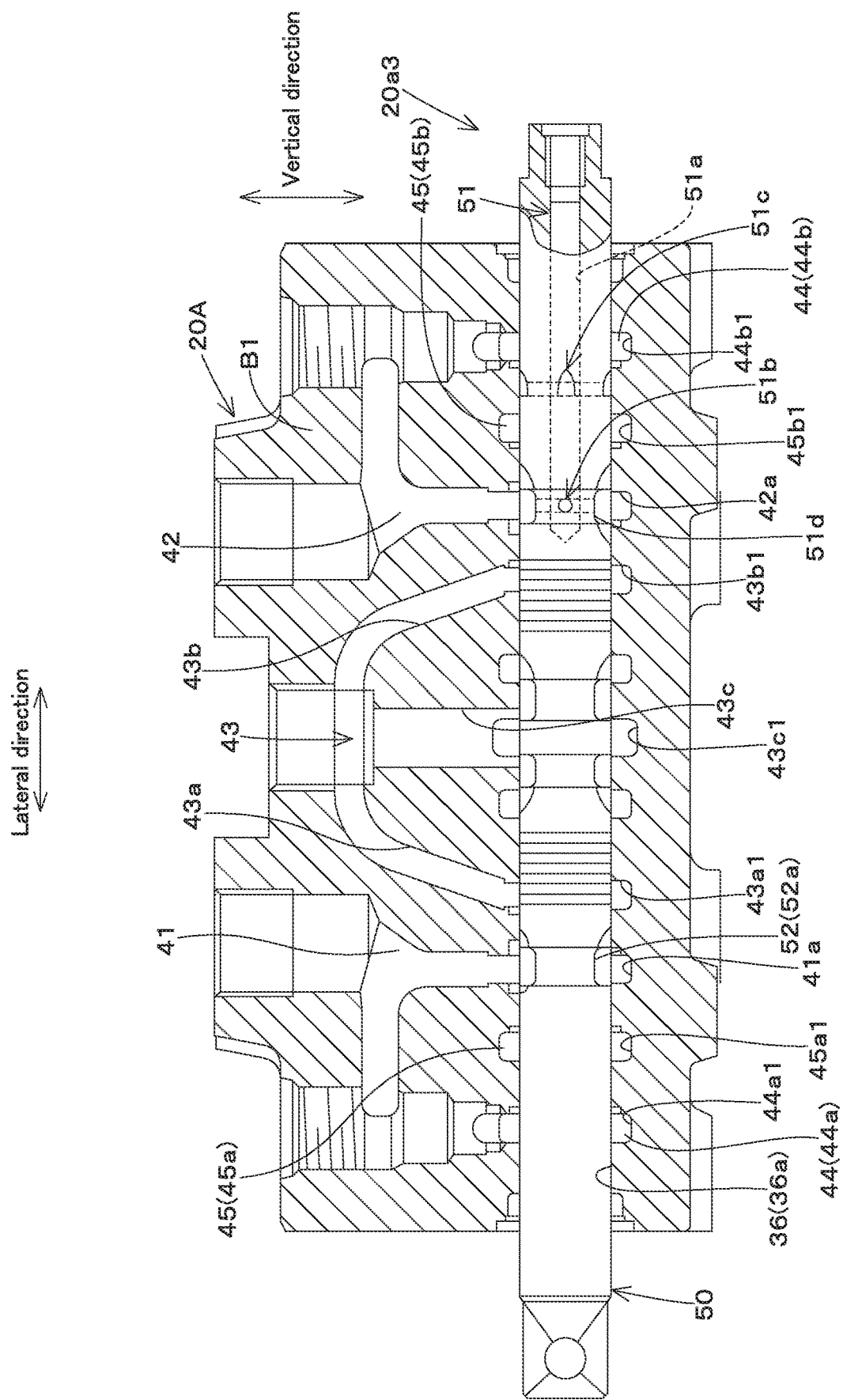
FIG. 4A is a view illustrating an inside of a control valve being in a neutral position according to the second embodiment.

As shown in FIG. 4A, the first control valve 20A includes a main body B1. The main body B1 is formed of a casting, a resin, or the like. A fluid tube through which the operation fluid flows is formed inside the main body B1. That is, the main body B1 has a first internal fluid tube 41, a second internal fluid tube 42, a third internal fluid tube 43, a fourth internal fluid tube 44, and a fifth internal fluid tube 45.

Figure 4B:
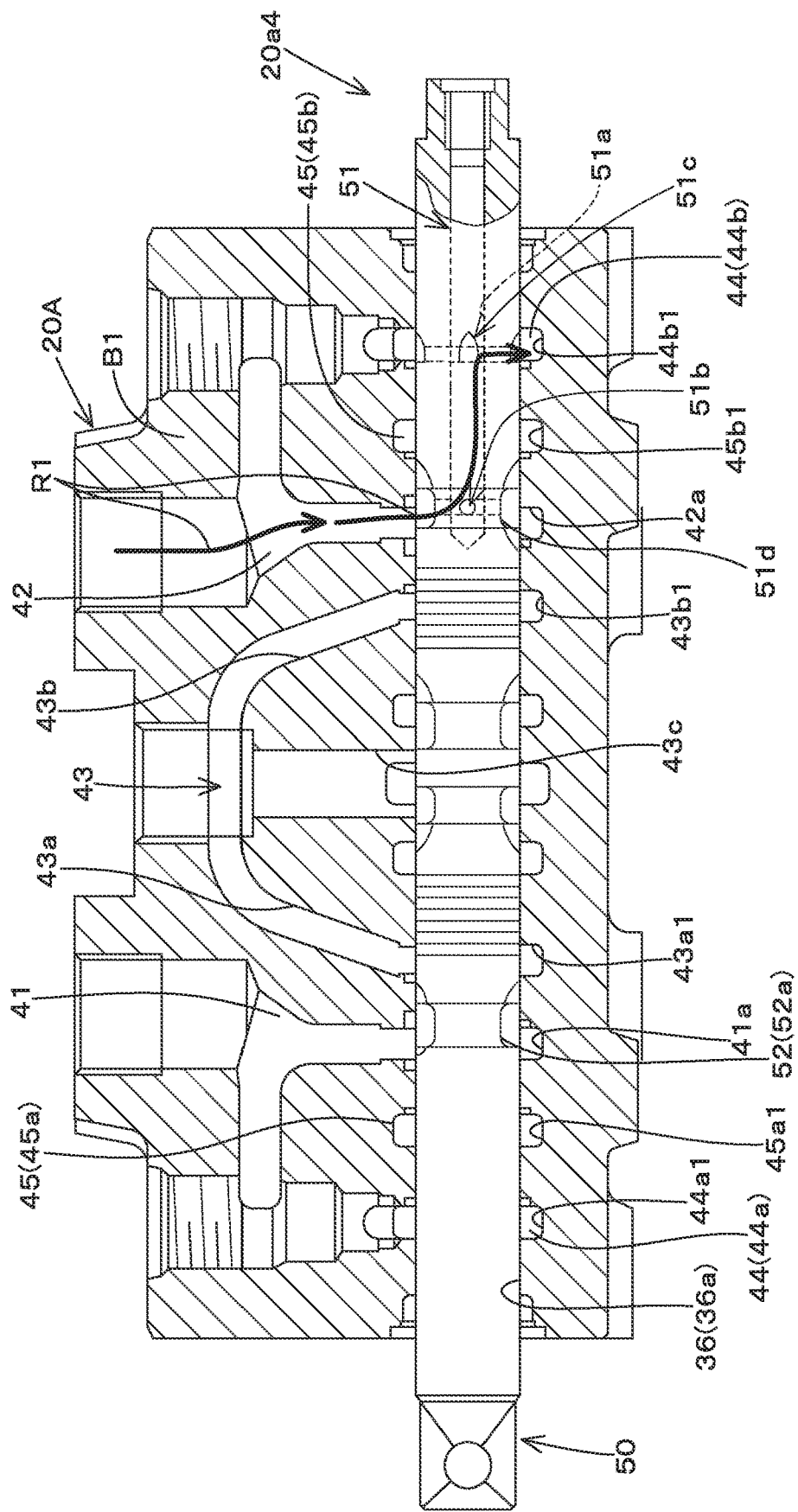
FIG. 4B is a view illustrating the inside of the control valve being in a position between the neutral position and a first position according to the second embodiment.
Figure 4C:
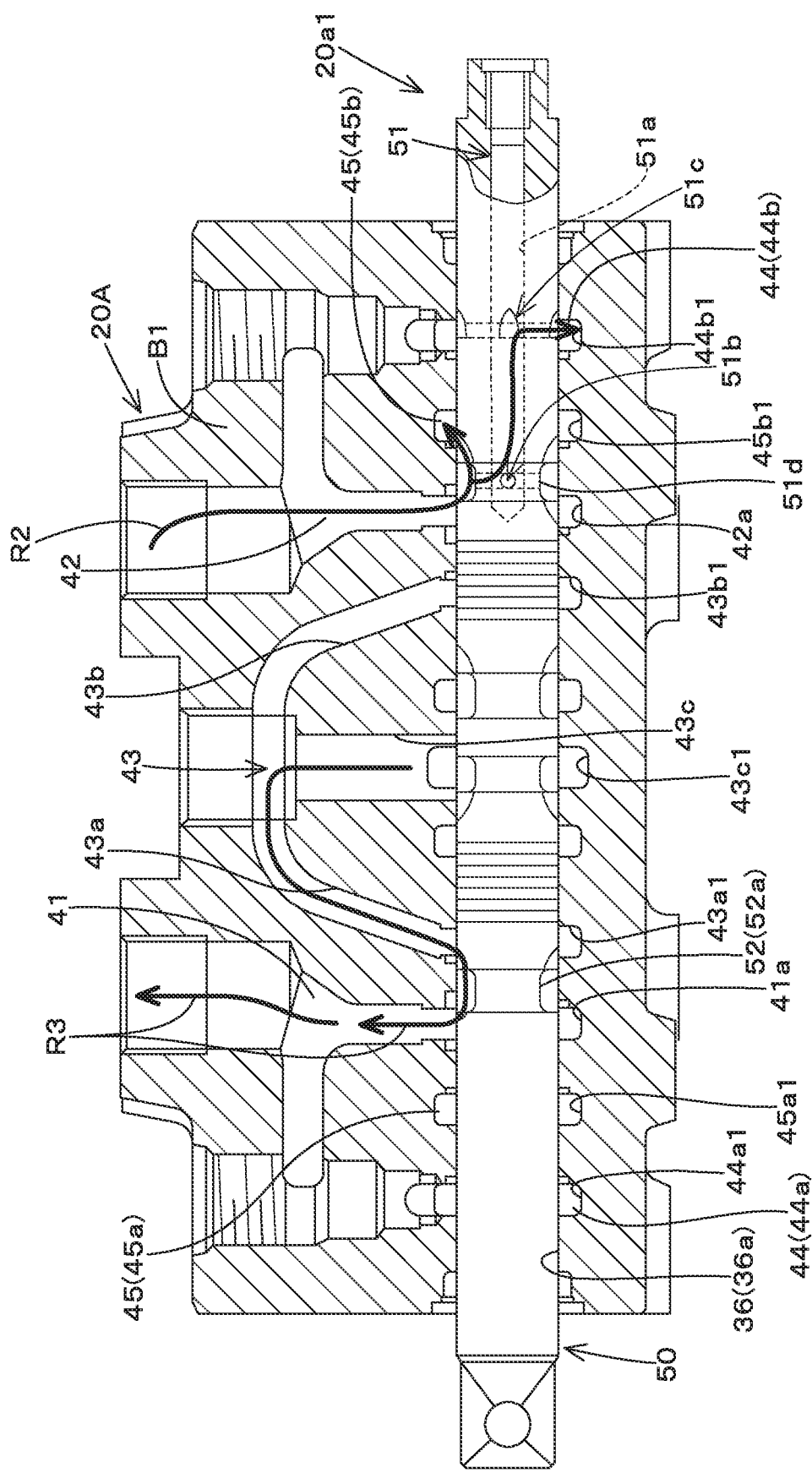
FIG. 4C is a view illustrating the inside of the control valve being in the first position according to the second embodiment.

In convenience of the explanation, the left side of the page in FIG. 4A to FIG. 4C is referred to as the left, the right side of the page is referred to as the right, the directions toward the left and toward the right are referred to as a lateral direction, and a direction orthogonal to the lateral direction is referred to as a vertical direction. In addition, the first internal fluid tube 41, the second internal fluid tube 42, the third internal fluid tube 43, the fourth internal fluid tube 44, and the fifth internal fluid tube 45 will be explained referring to a cross-sectional view of FIG. 4A.

The first internal fluid tube 41 is a fluid tube formed inside the main body B1, and is communicated with the first port 31. A first port 31 is provided on a left portion of the main body B1 in the lateral direction, and a first internal fluid tube 41 is formed next to the first port 31. The first internal fluid tube 41 is extended at least in the longitudinal direction.

The second internal fluid tube 42 is a fluid tube formed inside the main body B1, and is communicated with the second port 32. The second port 32 is provided on a right portion of the main body B1 in the lateral direction, and a second internal fluid tube 42 is formed next to the second port 32. The second internal fluid tube 42 is extended at least in the longitudinal direction.

The third internal fluid tube 43 is a fluid tube formed inside the main body B1, and is communicated with the third port 33. The third internal fluid tube 43 is formed in a central portion of the main body B1 in the lateral direction. In particular, the third internal fluid tube 43 includes a left fluid tube 43a, a right fluid tube 43b, and a central fluid tube 43c.

The central fluid tube 43c is formed at the center of the main body B1 in the lateral direction, and is communicated with the port 33c. The left fluid tube 43a is located on the left of the central fluid tube 43c, and is communicated with the port 33a. The right fluid tube 43b is located on the right of the central fluid tube 43c, and is communicated with the port 33b. The left fluid tube 43a and the central fluid tube 43c are communicated with each other, and the right fluid tube 43b and the central fluid tube 43c are communicated with each other. The left fluid tube 43a, the right fluid tube 43b, and the central fluid tube 43c are extended at least in the vertical direction.

The fourth internal fluid tube 44 is a fluid tube formed inside the main body B1, and is communicated with the fourth port 34. In particular, the fourth internal fluid tube 44 includes a left fluid tube 44a and a right fluid tube 44b.

The left fluid tube 44a is formed on the left portion of the main body B1 in the lateral direction, and is communicated with the port 34a. The left fluid tube 44a is located on the left of the first internal fluid tube 41. The right fluid tube 44b is formed on the right portion of the main body B1 in the lateral direction, and is communicated with the port 34b. The right fluid tube 44b is located on the right of the second internal fluid tube 42. The left fluid tube 44a and the right fluid tube 44b are extended at least in the vertical direction.

The fifth internal fluid tube 45 is a fluid tube formed inside the main body B1, and is communicated with the fifth port 35. In particular, the fifth internal fluid tube 45 includes a left fluid tube 45a and a right fluid tube 45b.

The left fluid tube 45a is formed on the left portion of the main body B1 in the lateral direction, and is communicated with the port 35a. The left fluid tube 45a is located between the first internal fluid tube 41 and the left fluid tube 44a of the fourth internal fluid tube 44. The right fluid tube 45b is formed on the right portion of the main body B1 in the lateral direction, and is communicated with the port 35b. The right fluid tube 45b is located between the second internal fluid tube 42 and the right fluid tube 44b of the fourth internal fluid tube 44. The left fluid tube 45a and the right fluid tube 45b are extended at least in the vertical direction.

Meanwhile, a wall portion 36 (a through hole 36a) having an annular shape extending from one end (the left end) of the main body B1 to the other end (the right end) in the lateral direction is formed. That is, the main body B1 is formed with the through hole 36a extending straight into which the spool 50 having a cylindrical shape is inserted.

The first internal fluid tube 41, the second internal fluid tube 42, the third internal fluid tube 43, the fourth internal fluid tube 44, and the fifth internal fluid tube 45 extend to the annular wall portion 36 constituting the through hole 36a. The end portion 41a of the first internal fluid tube 41 extends to the wall portion 36. The end portion 42a of the second internal fluid tube 42 extends to the wall portion 36. The end portion 43a1 of the left fluid tube 43a of the third internal fluid tube 43 extends to the wall portion 36. The end portion 43b1 of the right fluid tube 43b of the third internal fluid tube 43 extends to the wall portion 36. The end portion 43c1 of the central fluid tube 43c of the third internal fluid tube 43 extends to the wall portion 36.

The end portion 44a1 of the left fluid tube 44a of the fourth internal fluid tube 44 extends to the wall portion 36. The end portion 44b1 of the right fluid tube 44b of the fourth internal fluid tube 44 extends to the wall portion 36. The end portion 45a1 of the left fluid tube 45a of the fifth internal fluid tube 45 extends to the wall portion 36. The end portion 45b1 of the right fluid tube 45b of the fifth internal fluid tube 45 extends to the wall portion 36.

In addition, each of the end portion 41a, the end portion 42a, the end portion 43a1, the end portion 43b1, the end portion 43c1, the end portion 44a1, the end portion 44b1, the end portion 45a1, and the end portion 45b1 is formed in a concave shape.

As shown in FIG. 4A, the first control valve 20A has a spool 50. The spool 50 is configured to move inside the main body B1 to change the communication destinations of the first internal fluid tube 41, the second internal fluid tube 42, the third internal fluid tube 43, the fourth internal fluid tube 44 and the fifth internal fluid tube 45.

Hereinafter, the spool 50 will be described below in detail.

The spool 50 is formed to have a cylindrical shape. The spool 50 having a cylindrical shape is inserted into the through hole 36a formed inside the main body B1. The left end or the right end of the spool 50 protrudes from the main body B1. An operation member such as a lever is connected to the protruding portion (the projecting portion) of the spool 50.

The spool 50 has a first communicating portion 51. The first communicating portion 51 is a portion configured to communicate the second internal fluid tube 42, the fourth internal fluid tube 44, and the fifth internal fluid tube 45 with each other. In particular, the first communicating portion 51 includes a first extending fluid tube 51a, the plurality of second extending fluid tubes 51b, a plurality of third extending fluid tubes 51c, and a first concaved portion 51d.

The first extending fluid tube 51a is a fluid tube extending inside the spool 50 in the longitudinal direction (an axial direction) of the spool 50, and is formed by forming inside the spool 50 a hole extending in the axial direction of the spool 50. The first extending fluid tube 51a extends from the middle portion of the spool 50 to the right portion. The left end and the right end of the first extending fluid tube 51a are closed. Accordingly, the hydraulic fluid that has entered the first extending fluid tube 51a flows inside the spool 50 in the axial direction of the spool 50.

The plurality of second extending fluid tubes 51b is a fluid tube extending from the left end of the first extending fluid tube 51a to the outer circumference surface of the spool 50, and is communicated with the first extending fluid tube 51a. The plurality of second extending fluid tubes 51b are communicated with the left portion of the first extending fluid tube 51a. As shown in FIG. 4A, the spool 50 is provided with the plurality of second extending fluid tubes 51b at a predetermined interval in the circumferential direction.

The plurality of third extending fluid tubes 51c are fluid tubes extending from the middle of the first extending fluid tube 51a to the outer circumference face of the spool 50, and is communicated with the first extending fluid tube 51a. The plurality of third extending fluid tubes 51c are communicated with a middle portion of the first extending fluid tube 51a. As shown in FIG. 4A, the spool 50 is provided with the plurality of third extending fluid tubes 51c at a predetermined interval in the circumferential direction.

The first concave portion 51d is a portion formed by annularly denting the outer circumference surface of the spool 50. The first concave portion 51d is located on the right portion of the spool 50 and is overlapped with the second extending fluid tube 51b.

Meanwhile, the spool 50 has the second communicating portion 52.

The second communicating portion 52 is configured to communicate the first internal fluid tube 41 and the fifth internal fluid tube 45 with each other. In addition, the second communicating portion 52 is configured to communicate the first internal fluid tube 41 and the third internal fluid tube 43 with each other. In particular, the second communicating portion 52 includes the second concave portion 52a. The second concave portion 52a is a portion formed by annularly denting the outer circumference surface of the spool 50. The second recessed portion 52a is located on the left portion of the spool 50.

As shown in FIG. 4B, the spool 50 is positioned in the middle portion (the middle position 20a4) between the neutral position 20a3 and the first position 20a1. To be explained in detail, the first concave portion 51d and the end portion 42a of the second internal fluid tube 42 are overlapped (matched) with each other.

In addition, the third extending fluid tube 51c is overlapped (matched) with the right fluid tube 44b (the end portion 44b1) of the fourth internal fluid tube 44. That is, when the first control valve 20A is in the middle position 20a4, the second internal fluid tube 42 and the fourth internal fluid tube 44 can be communicated with each other.

When the first control valve 20A is in the middle position 20a4, the return fluid returning from the boom cylinder (the first hydraulic device) 14 to the first control valve 20A is discharged through the second fluid tube 22, the second internal fluid tube 42, the first concave portion 51d, the first communicating portion 51, the fourth internal fluid tube 44, and the fourth fluid tube 24, as indicated by R1 in FIG. 4B.

As shown in FIG. 4C, the spool 50 is located at the first position 20a1 (the communicating position 20a1). To be explained in detail, the first concave portion 51d, the end portion 42a of the second internal fluid tube 42, and the right fluid tube 45b (the end portion 45b1) of the fifth internal fluid tube 45 are overlapped (matched) with each other. In addition, the third extending fluid tube 51c and the right fluid tube 44b (the end portion 44b1) of the fourth internal fluid tube 44 are overlapped (matched) with each other.

The second concave portion 52a, the end portion 41a of the first internal fluid tube 41, and the left fluid tube 43a (the end portion 43a1) of the third internal fluid tube 43 are overlapped (matched) with each other. That is, when the first control valve 20A is in the first position 20a1, the second internal fluid tube 42, the fourth internal fluid tube 44, and the fifth internal fluid tube 45 can communicate with each other.

When the first control valve 20A is in the first position 20a1, the return fluid returning from the boom cylinder 14 to the first control valve 20A is discharged through the second internal fluid tube 42, the first communicating portion 51, and the fourth internal fluid tube 44, as indicated by R2 in FIG. 4C. In addition, the return fluid returning from the boom cylinder 14 to the first control valve 20A is supplied to the second control valve 20B through the second fluid tube 22, the second internal fluid tube 42, the first communicating portion 51, the fifth internal fluid tube 45, and the fifth fluid tube 25.

When the first control valve 20A is in the first position 20a1, the hydraulic fluid discharged from the operation fluid tank P1 is supplied to the boom cylinder 14 through the third internal fluid tube 43 (the right fluid tube 43a), the second internal fluid tube 42, the second communicating portion 52, the first internal fluid tube 41 (the end portion 41a), and the first fluid tube 21, as indicated by R3 in FIG. 4C.

As described above, when the spool 50 is in the middle position 20a4, the spool 50 has the first communicating portion 51 configured to communicate the second internal fluid tube 42 and the fourth internal fluid tube 44 with each other. In this manner, in the case where the spool 50 is moved from the neutral position 20a3 to the first position 20a1, the second internal fluid tube 42 and the fourth internal fluid tube 44 can be communicated with each other before the second internal fluid tube 42 and the fifth internal fluid tube 45 are communicated with each other. In addition, in the case where the spool 50 is moved from the neutral position 20a3 to the first position 20a1, the second internal fluid tube 42 and the fourth internal fluid tube 44 can be communicated with each other before the first internal fluid tube 41 and the third internal fluid tube 43 are communicated with each other.

For example, when paying attention to the control valve (the first control valve 20A) on the upstream side and the control valve (the second control valve 20B) on the downstream side, the second internal fluid tube 42 and the fourth internal fluid tube 44 can be communicated with each other before the second internal fluid tube 42 and the fifth internal fluid tube 45 are communicated with each other. Thus, the operation fluid having passed through the control valve (the first control valve 20A) on the upstream side can be discharged independently from the control valve (the second control valve 20B) on the downstream side, and thus it is possible to stably operate the first hydraulic equipment 14 disposed on the upstream side.

In addition, the spool 50 has a first communicating portion 51 configured to communicate the second internal fluid tube 42, the fourth internal fluid tube 44, and the fifth internal fluid tube 45 with each other. The first communicating portion 51 includes a first extending fluid tube 51a, a plurality of second extending fluid tubes 51b, and a plurality of third extending fluid tubes 51c. The first extending fluid tube 51a extends in the longitudinal direction of the spool 50. The plurality of second extending fluid tubes 51b extends from one end of the first extending fluid tube 51a to the outer circumference surface of the spool 50. The plurality of third extending fluid tubes 51c extends from a middle portion of the first extending fluid tube 51a to the outer circumference surface of the spool 50.

In this manner, the first communicating section 51 can be provided by forming the first extending fluid tube 51a, the second extending fluid tube 51b, and the third extending fluid tube 51c in the inside of and on the outer circumference surface of the spool 50. Thus, the operation fluid can be discharged by the first communicating portion 51 without processing the main body B1, the first communicating portion 51 being provided in the spool 50.

Meanwhile, the configurations similar to the configurations of the first communicating portion 51 can also be applied to the left portion of the spool 50. That is, when the configuration similar to the first position 20a1 is applied to the second position 20a2, the first internal fluid tube 41 and the fourth internal fluid tube 44 are communicated with each other before the first internal fluid tube 41 and the fifth internal fluid tube 45 are communicated with each other in the case where the spool 50 is moved from the neutral position 20a3 to the second position 20a2.

In addition, in the case where the spool 50 is moved from the neutral position 20a3 to the second position 20a2, the first internal fluid tube 41 and the fourth internal fluid tube 44 can be communicated with each other before the second internal fluid tube 42 and the third internal fluid tube 43 are communicated with each other.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

In the above-described embodiment, the first hydraulic device is the boom cylinder 14, and the second hydraulic device is the bucket cylinder 17. However, the first hydraulic device and the second hydraulic device may be other hydraulic cylinders and are not limited to the configurations. In addition, although the discharge fluid tube 24 is connected to the operation fluid tank 15, the discharge destination of the operation fluid is not limited to the operation fluid tank 15, may be a suction portion of the hydraulic pump, and may be another component, and is not limited to the configurations.

Third Embodiment

Referring to the drawings appropriately, preferred embodiments of the hydraulic system of the working machine according to the present invention and preferred embodiments of the working machine provided with the hydraulic system will be described below.

Firstly, the working machine will be explained.

FIG. 6 shows a side view of the working machine according to the embodiment of the present invention. FIG. 6 shows a skid steer loader as an example of the working machine. However, the working machine according to the embodiment is not limited to the skid steer loader, and may be another type of a loader working machine such as a compact track loader. In addition, a working machine other than the loader working machine may be employed.

The working machine 1 includes the machine body (a vehicle body) 2, the cabin 3, the working device 4, and the traveling devices 5A and 5B.

The cabin 3 is mounted on the machine body 2. An operator seat 8 is disposed at a rear portion of an inside of the cabin 3. In explanations of the embodiments of the present invention, a front side (a left side in FIG. 6) of the operator seated on the operator seat 8 of the working machine 1 is referred to as the front (a front side), a rear side (a right side in FIG. 6) of the operator seated on the operator seat 8 of the working machine 1 is referred to as the rear (a rear side), a left side (a front surface side in FIG. 6) of the operator seated on the operator seat 8 of the working machine 1 is referred to as the left (a left side), and a right side (a back surface side in FIG. 6) of the operator seated on the operator seat 8 of the working machine 1 is referred to as the right (a right side).

In addition, a horizontal direction corresponding to a direction perpendicular to the front-to-rear direction will be referred to as a machine width direction. A direction extending from the center portion of the machine body 2 to the right portion or the left portion will be referred to as machine outward. In other words, the machine outward is a machine width direction that corresponds to a direction separating away from the machine body 2. In the explanation, a direction opposite to the machine outward is referred to as a machine inward. In other words, the machine inward is a machine width direction that corresponds to a direction approaching the machine body 2.

The cabin 3 is mounted on the machine body 2. The working device 4 is a device configured to perform a work, and is mounted on the machine body 2. The traveling device 5A is a device configured to allow the machine body 2 to travel, and is disposed on the left side of the machine body 2. The traveling device 5B is a device configured to allow the machine body 2 to travel, and is disposed on the right side of the machine body 2. A prime mover (a motor) 7 is disposed at a rear portion of an inside of the machine body 2. The prime mover 7 is a diesel engine (an engine). Meanwhile, it should be noted that the prime mover 7 is not limited to the engine and may be an electric motor or the like.

On the left side of the operator seat 8, a traveling lever 9L is provided. On the right side of the operator seat 8, a traveling lever 9R is provided. The traveling lever 9L disposed on the left is provided for operating the travel device 5A disposed on the left and the traveling lever 9R disposed on the right is provided for operating the travel device 5B disposed on the right.

The working device 4 includes a boom 10, a bucket 11, a lift link 12, a control link 13, a boom cylinder (a hydraulic cylinder) 14 and a bucket cylinder 17. The boom 10 is provided on the side of the machine body 2. The bucket 11 is provided on a tip portion (a front end) of the boom 10. The lift link 12 and the control link 13 support abase portion (a rear portion) of the boom 10. The boom cylinder 14 moves the boom 10 upward and downward.

More specifically, the lift link 12, the control link 13, and the boom cylinder 14 are provided on the side of the machine body 2. The upper portion of the lift link 12 is pivotally supported by the upper portion of the base portion of the boom 10. The lower portion of the lift link 12 is pivotally supported on the side portion of the rear portion of the machine body 2. The control link 13 is disposed forward from the lift link 12. One end of the control link 13 is pivotally supported by a lower portion of the base portion of the boom 10, and the other end is pivotally supported by the machine body 2.

The boom cylinder 14 is constituted of a hydraulic cylinder configured to move the boom 10 upward and downward. The upper portion of the boom cylinder 14 is pivotally supported by the front portion of the base portion of the boom 10. The lower portion of the boom cylinder 14 is pivotally supported by the side portion of the rear portion of the machine body 2. When the boom cylinder 14 is stretched and shortened, the boom 10 is swung up and down by the lift link 12 and the control link 13. The bucket cylinder 17 is constituted of a hydraulic cylinder configured to swing the bucket 11.

The bucket cylinder 17 couples the left portion of the bucket 11 and the boom disposed on the left to each other, and couples the right portion of the bucket 11 and the boom disposed on the right to each other. Meanwhile, it should be noted that, instead of the bucket 11, an auxiliary attachment such as a hydraulic crusher, a hydraulic breaker, an angle bloom, an auger, a pallet fork, a sweeper, a mower, a snow blower may be attached to the tip portion (the front portion) of the boom 10.

In the present embodiment, the traveling devices 5A and 5B respectively employ wheeled traveling devices 5A and 5B each having a front wheel 5F and a rear wheel 5R. Meanwhile, traveling devices 5A and 5B of a crawler type (including a semi-crawler type) may be employed as the traveling devices 5A and 5B.

Next, a working-system hydraulic circuit (a working-system hydraulic system) disposed in the skid steer loader 1 will be described below.

Figure 5:
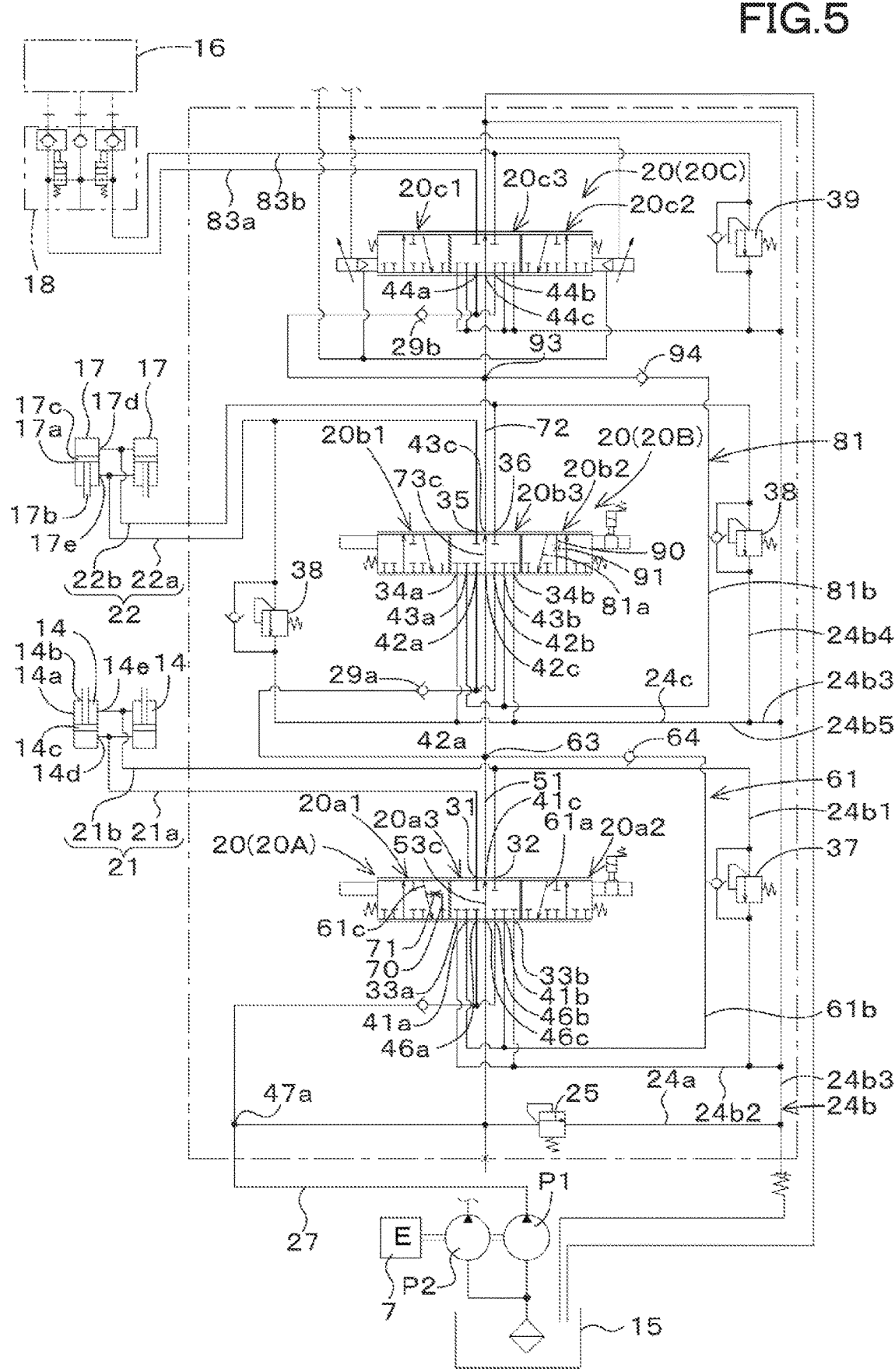
FIG. 5 is a view illustrating a hydraulic system (a hydraulic circuit) according to a third embodiment of the present invention.

As shown in FIG. 5, the working-system hydraulic system is a system configured to operate the boom 10, the bucket 11, the auxiliary attachment, and the like. And, the working-system hydraulic system includes a control valve unit 70 and a hydraulic pump of working system (a first hydraulic pump) P1. In addition, the working-system hydraulic system includes a second hydraulic pump P2 different from the first hydraulic pump P1.

The first hydraulic pump P1 is a pump configured to be operated by the power of the prime mover 7, and is constituted of a gear pump of constant-displacement type (a constant-displacement type gear pump). The first hydraulic pump P1 is configured to output an operation fluid (a hydraulic oil) stored in a tank (an operation fluid tank) 15. The second hydraulic pump P2 is a pump configured to be operated by the power of the prime mover 7, and is constituted of a gear pump of constant-displacement type (a constant-displacement type gear pump).

The second hydraulic pump P2 is configured to output the operation fluid stored in the tank (the operation fluid tank) 15. Meanwhile, in the hydraulic system, the second hydraulic pump P2 is configured to output the hydraulic fluid for signals (a signal hydraulic fluid) and the hydraulic fluid for control (a control hydraulic fluid). Each of the hydraulic fluid for signals (the signal hydraulic fluid) and the hydraulic fluid for control (the control hydraulic fluid) is referred to as a pilot fluid (a pilot oil).

The plurality of control valves 20 are valves configured to control various types of the hydraulic actuators disposed on the working machine 1. The hydraulic actuator is a device configured to be operated by the hydraulic fluid, such as a hydraulic cylinder, a hydraulic motor, or the like. In the embodiment, the plurality of control valves 20 include a boom control valve 20A, a bucket control valve 20B, and a auxiliary control valve 20C.

The boom control valve 20A is a valve configured to control the hydraulic actuator (the boom cylinder) 14 that is configured to operate the boom 10. The boom control valve 20A is a three-position switching valve having a spool directly acting with a pilot fluid (referred to as a pilot direct-acting spool type three-position switching valve). The boom control valve 20A is configured to be switched to a neutral position 20$a$3, to a first position 20$a$1 other than the neutral position 20$a$3, and to a second position 20$a$2 other than the neutral position 20$a$3 and the first position 20$a$1. In the boom control valve 20A, the switching between the neutral position 20$a$3, the first position 20$a$1, and the second position 20$a$2 is performed by a spool moved by operation of the operation member.

The switching of the boom control valve 20A is performed by directly moving the spool with manual operation of the operating member. However, the spool may be moved by the hydraulic operation (by the hydraulic operation using a pilot valve, the hydraulic operation using a proportional valve), the spool may be moved by the electric operation (the electric operation by magnetizing the solenoid), or the spool may be moved by other methods.

The boom control valve 20A and the first hydraulic pump P1 are connected to each other by an output fluid tube 27. A discharge fluid tube 24$a$ connected to the operation fluid tank 15 is connected to a section of the output fluid tube 27 between the boom control valve 20A and the first hydraulic pump P1. A relief valve (a main relief valve) 25 is disposed on a middle portion of the discharge fluid tube 24$a$.

The hydraulic fluid discharged from the first hydraulic pump P1 passes through the output fluid tube 27 and is supplied to the boom control valve 20A. In addition, the boom control valve 20A and the boom cylinder 14 are connected to each other by a fluid tube 21.

In particular, the boom cylinder 14 includes a cylindrical body 14$a$, a rod 14$b$ movably provided on the cylindrical body 14$a$, and a piston 14$c$ provided on the rod 14$b$. A first port 14$d$ for supplying and discharging the operation fluid is provided on a base end portion (on a side opposite to the rod 14$b$ side) of the cylindrical body 14$a$. A second port 14$e$ for supplying and discharging the operation fluid is provided on a tip end (on the rod 14$b$ side) of the cylindrical body 14$a$.

The fluid tube 21 has a first connection fluid tube 21$a$ and a second connection fluid tube 21$b$. The first connection fluid tube 21$a$ connects the first port 31 of the boom control valve 20A to the first port 14$d$ of the boom cylinder 14. The second connection fluid tube 21$b$ connects the second port 32 of the boom control valve 20A to the second port 4$e$ of the boom cylinder 14.

Thus, when the boom control valve 20A is set to the first position 20$a$1, the operation fluid can be supplied from the first connection fluid tube 21$a$ to the first port 14$d$ of the boom cylinder 14, and the operation fluid can be discharged from the second port 4$e$ of the boom cylinder 14 to the second connection fluid tube 21$b$.

In this manner, the boom cylinder 14 is stretched, and thereby the boom 10 moves upward. When the boom control valve 20A is set to the second position 20$a$2, it is possible to supply the operation fluid from the second connection fluid tube 21$b$ to the second port 14$e$ of the boom cylinder 14, and possible to discharge the operation fluid from the first port 14$d$ of the boom cylinder 14 to the first connection fluid tube 21$a$. In this manner, the boom cylinder 14 is shortened, and thereby the boom 10 moves downward.

The bucket control valve 20B is a valve configured to control the hydraulic cylinder (the bucket cylinder) 17 that is configured to control the bucket 11. The bucket control valve 20B is a three-position switching valve having a spool directly acting with a pilot fluid (referred to as a pilot direct-acting spool type three-position switching valve).

The bucket control valve 20B is configured to be switched to a neutral position 20$b$3, to a first position 20$b$1 other than the neutral position 20$b$3, and to a second position 20$b$2 other than the neutral position 20$b$3 and the first position 20$b$1. In the second control valve 20B, the switching between the neutral position 20$b$3, the first position 20$b$1, and the second position 20$b$2 is performed by a spool moved by operation of the operation member.

The switching of the bucket control valve 20B is performed by directly moving the spool with manual operation of the operating member. However, the spool may be moved by the hydraulic operation (by the hydraulic operation using a pilot valve, the hydraulic operation using a proportional valve), the spool may be moved by the electric operation (the electric operation by magnetizing the solenoid), or the spool may be moved by other methods.

The bucket control valve 20B and the bucket cylinder 17 are connected to each other by a fluid tube 22. In particular, the bucket cylinder 17 includes a cylindrical body 17$a$, a rod 17$b$ movably provided on the cylindrical body 17$a$, and a piston 17$c$ provided on the rod 17$b$. A first port 17$d$ configured to supply and discharge the operation fluid is provided at the base end portion (on a side opposite to the rod 17$b$ side) of the cylindrical body 17$a$. A second port 17$e$ configured to supply and discharge the operation fluid is provided on the tip end side (on the rod 17$b$) of the cylindrical body 17$a$.

The fluid tube 22 has a first connection fluid tube 22$a$ and a second connection fluid tube 22$a$. The first connection fluid tube 22$a$ connects the first port 35 (which may be referred to as a first actuator port) of the bucket control valve 20B to the second port 17$e$ of the bucket cylinder 17. The second connection fluid tube 22$a$ connects the second port 36 (which may be referred to as a second actuator port) of the bucket control valve 20B to the first port 17$d$ of the bucket cylinder 17.

Thus, when the bucket control valve 20B is set to the first position 20B1, the operation fluid can be supplied from the first connection fluid tube 22$a$ to the second port 17$e$ of the bucket cylinder 17, and the operation fluid can be discharged from the first port 17$d$ of the bucket cylinder 17 to the second supply tube 22$b$.

In this manner, the bucket cylinder 17 is shortened, and thus the bucket 11 is operated in a shoveling manner. When the bucket control valve 20B is set to the second position 20$a$2, the hydraulic fluid can be supplied from the second supply tube 22$b$ to the first port 17$d$ of the bucket cylinder 17, and the hydraulic fluid can be discharged from the second port 17$e$ of the bucket cylinder 17 to the first connection fluid tube 22$a$. In this manner, the bucket cylinder 17 is stretched, and thus the bucket 11 is operated in the dumping manner.

Meanwhile, a discharge fluid tube 24$c$ is connected to the first connection fluid tube 22$a$ and the second connection fluid tube 22$b$, and a relief valve 38 is provided on the discharge fluid tube 24c. A set pressure of the relief valve 38 is determined, for example, to be higher than a set pressure of the main relief valve 25.

The auxiliary control valve 20C is a three-position switching valve having a spool directly acting with a pilot fluid (referred to as a pilot direct-acting spool type three-position switching valve). The auxiliary control valve 20C is configured to be switched to a neutral position 20c3, to a first position 20c1 other than the neutral position 20c3, and to a second position 20c2 other than the neutral position 20c3 and the first position 20c1.

In the auxiliary control valve 20C, the switching between the neutral position 20c3, the first position 20c1, and the second position 20c2 is performed by a spool moved by operation of the operation member. A connecting member 18 is connected to the auxiliary control valve 20C by the supply/discharge fluid tubes 83a and 83b. A fluid tube connected to the hydraulic actuator 16 of the auxiliary attachment is connected to the connecting member 18.

Thus, when the auxiliary control valve 20C is set to the first position 20c1, the operation fluid can be supplied from the supply/discharge fluid tube 83a to the hydraulic actuator 16 of the auxiliary attachment. When the auxiliary control valve 20C is set to the second position 20c2, the operation fluid can be supplied from the supply/discharge fluid tube 83b to the hydraulic actuator 16 of the auxiliary attachment.

In this manner, when the operation fluid is supplied from the supply/discharge fluid tube 83a or the supply/discharge fluid tube 83b to the hydraulic actuator 16, the hydraulic actuator 16 (the auxiliary attachment) can be operated.

Meanwhile, in the hydraulic system, a series circuit (a series fluid tube) is employed. In the series circuit, the hydraulic fluid having returned from the hydraulic actuator to the control valve on the upstream side can be supplied to the control valve disposed on the downstream side. For example, paying attention to the bucket control valve 20B and the auxiliary control valve 20C, the bucket control valve 20B is the control valve disposed on the upstream side, and the auxiliary control valve 20C is the control valve disposed on the downstream side.

Hereinafter, the control valve on the upstream side is referred to as "a first control valve", and the control valve on the downstream side is referred to as "a second control valve". A control valve other than the first control valve and the second control valve, the control valve being provided on the upstream side of the second control valve is referred to as "a third control valve".

In addition, the hydraulic actuator corresponding to the first control valve is referred to as "a first hydraulic actuator", the hydraulic actuator corresponding to the second control valve is referred to as "a second hydraulic actuator", and the hydraulic actuator corresponding to the third control valve is referred to as "a third hydraulic actuator". The fluid tube configured to supply the return fluid, which is the operation fluid returning from the first hydraulic actuator to the first control valve, to the second control valve is referred to as "a first fluid tube".

In the embodiment, the bucket control valve 20B is referred to as "the first control valve", the auxiliary control valve 20C is referred to as "the second control valve", and the boom control valve 20A is referred to as "the third control valve". In addition, the bucket cylinder 17 is referred to as "the first hydraulic actuator", the hydraulic actuator 16 of the auxiliary attachment is referred to as "the second hydraulic actuator", and the boom cylinder 14 is referred to as "the third hydraulic actuator".

Hereinafter, the first control valve, the second control valve, and the third control valve will be described below in detail.

The third control valve 20A and the output portion of the first hydraulic pump P are connected to each other by an output fluid tube 27. The output fluid tube 27 is branched off at a middle portion 47a. The branched fluid tube of the output fluid tube 27 is connected to the first input port 46a and the second input port 46b of the third control valve 20A. In addition, the output fluid tube 27 is connected to the third input port 46c of the third control valve 20A.

In this manner, the hydraulic fluid outputted from the first hydraulic pump P1 can be supplied into the third control valve 20A through the output fluid tube 27, the first input port 46a, the second input port 46b, and the third input port 46c. The third control valve 20A and the first control valve 20B are connected to each other by a central fluid tube 51. The central fluid tube 51 connects the third output port 41c of the third control valve 20A to the third input port 42c of the first control valve 20B.

Meanwhile, when the third control valve 20A is set to the neutral position 20a3, the central fluid tube 53c connecting the third input port 46c to the third output port 41c is communicated through therein, and thereby the supplied fluid that is the operation fluid supplied from the output fluid tube 27 to the third control valve 20A passes through the third control valve 20A and then is supplied to the central fluid tube 51.

The third control valve 20A and the first control valve 20B are connected to each other by a return fluid tube 61 separately from the central fluid tube 51. The return fluid tube 61 is a fluid tube configured to supply the return fluid to the first control valve 20B through the third control valve 20A, the return fluid returning from the third hydraulic actuator 14 to the third control valve 20A. For convenience of the explanation, the return fluid tube 61 may be referred to as "a fourth fluid tube".

The return fluid tube 61 has a second connection fluid tube 21b, an internal fluid tube 61a, and an external fluid tube 61b. The second connection fluid tube 21b is a fluid tube connecting the second port 32 of the third control valve 20A to the second port 14e of the third hydraulic actuator 14, and also id a fluid tube in which the return fluid discharged from the second port 14e of the third hydraulic actuator 14 flows.

The second connection fluid tube 21b is connected to the discharge fluid tube 24b. The discharge fluid tube 24b includes a fluid tube 24b1, a fluid tube 24b2, and a fluid tube 24b3. The fluid tube 24b1 is connected to the second connection fluid tube 21b, the fluid tube 24b2 is connected to the first discharge port 33a and the second discharge port 33b of the third control valve 20A, and the fluid tube 24b3 connects the operation fluid tank 15 to a confluent portion of the fluid tube 24b1 and the passage 24b2. A relief valve 37 is provided at the middle of the fluid tube 24b1. The set pressure of the relief valve 37 is set, for example, to be higher than the set pressure of the main relief valve 25.

The internal fluid tube 61a is a fluid tube disposed on the third control valve 20A and communicated with the second connection fluid tube 21b. In particular, when the third control valve 20A is set to the second position 20a2, the internal fluid tube 61a is a fluid tube connecting the second port 32 of the third control valve 20A to the first output port 41a of the third control valve 20A.

The external fluid tube 61b is a fluid tube communicated with the internal fluid tube 61a and connected to the first control valve 20B. The external fluid tube 61b connects the first output port 41a of the third control valve 20A to the first input port 42a of the first control valve 20B, and connects the second output port 41b of the third control valve 20A to the second input port 42b of the first control valve 20B. The middle portion of the external fluid tube 61b is connected to the central fluid tube 51.

In other words, the external fluid tube 61b and the central fluid tube 51 are connected to each other at a middle portion. In the external fluid tube 61b, a check valve 29a is provided between a connecting portion 63 where the external fluid tube 61b and the central fluid tube 51 are connected to each other and the first control valve 20B. The check valve 29a allows the hydraulic fluid to flow from the connecting portion 63 to the first control valve 20B, and prevents the hydraulic fluid from flowing from the first control valve 20B to the connecting portion 63.

In addition, in the external fluid tube 61b, a check valve 64 is provided between the connecting portion 63 and the third control valve 20A. The check valve 64 allows the hydraulic fluid to flow from the third control valve 20A to the connecting portion 63, and prevents the hydraulic fluid from flowing from the connecting portion 63 to the third control valve 20A.

The first control valve 20B and the second control valve 20C are connected to each other by a central fluid tube (a second fluid tube) 72. The central fluid tube 72 connects the third output port 43c of the first control valve 20B to the third input port 44c of the second control valve 20C.

Thus, when the first control valve 20B is set to the neutral position 20b3, the supply fluid that is the operation fluid supplied to the first control valve 20B passes through a central fluid tube 73c (which may be referred to as a central internal fluid tube) connecting the third input port 42c to the third output port 43c, and then is supplied to the central fluid tube 72 connected to the third output port 43c.

The first control valve 20B and the second control valve 20C are connected to each other by the first fluid tube 81 separately from the central fluid tube 72. The first fluid tube 81 is a fluid tube configured to supply the return fluid to the second control valve 20C through the first control valve 20B, the return fluid returning from the first hydraulic actuator 17 to the first control valve 20B.

The first fluid tube 81 has a fluid tube (a first connection fluid tube) 22a, an internal fluid tube 81a (which may be referred to as a first internal fluid tube), and an external fluid tube 81b. The first connection fluid tube 22a is a fluid tube connecting the first port 35 of the first control valve 20B to the second port 17e of the first hydraulic actuator 17, and is a fluid tube in which the return fluid discharged from the second port 17e flows.

Meanwhile, the fluid tube (the second connection fluid tube) 22b is connected to the discharge fluid tube 24b. The discharge fluid tube 24b has a fluid tube 24b4, a fluid tube 24b5, and a fluid tube 24b3. The fluid tube 244 is connected to the second connection fluid tube 22b, the fluid tube 24b5 is connected to the first discharge port 34a and the second discharge port 34b of the first control valve 20B, and the fluid tube 24b3 connects the operation fluid tank 15 to the connecting portion of the fluid tube 244 and the fluid tube 24b5.

The internal fluid tube 81a is a fluid tube provided on the first control valve 20B and communicated with the first connection fluid tube 22a. In particular, when the first control valve 20B is set to the second position 20b2, the internal fluid tube 81a is a fluid tube connecting the second port 36 of the first control valve 20B to the first output port 43a of the first control valve 20B.

The external fluid tube 81b is a fluid tube communicated with the internal fluid tube 81a and connected to the second control valve 20C. The external fluid tube 81b connects the first output port 43a of the first control valve 20B to the first input port 44a of the second control valve 20C, and connects the second output port 43b of the first control valve 20B to the second output port 43b of the first control valve 20B. The middle portion of the external fluid tube 81b is connected to the central fluid tube 73c.

In other words, the external fluid tube 81b and the central fluid tube 73c are connected to each other at a middle portion. In the external fluid tube 81b, a check valve 29b is provided between a connecting portion 93 where the external fluid tube 81b and the central fluid tube 73c are connected to each other and the second control valve 20C. The check valve 29b allows the hydraulic fluid to flow from the connecting portion 93 to the second control valve 20C, and prevents the hydraulic fluid from flowing from the second control valve 20C to the connecting portion 93.

In addition, in the external fluid tube 81b, a check valve 94 is provided between the connecting portion 93 and the first control valve 20B. The check valve 94 allows the hydraulic fluid to flow from the first control valve 20B to the connecting portion 93, and prevents the hydraulic fluid from flowing from the connecting portion 93 to the first control valve 20B.

As described above, when the first control valve 20B is set to the second position 20B2 that is the side position, the supply fluid is supplied to the second input port 42b, and the supply fluid passes through the second connection fluid tube 22b and then is supplied to the first hydraulic actuator 17.

On the other hand, when the first control valve 20B is set to the second position 20b2, the return fluid discharged from the second port 17e of the first hydraulic actuator 17 passes through the first fluid tube 81, that is, through the first connection fluid tube 22a, the internal fluid tube 81a, and the external fluid tube 81b, and flows toward the second control valve 20C.

Meanwhile, the hydraulic system of the working machine is provided with a third fluid tube 90 (which may be referred to as a second internal fluid tube). The third fluid tube 90 is a fluid tube configured to return the return fluid to the first control valve 20B again through the first fluid tube 81, the return fluid flowing from the first control valve 20B to the second control valve 20C.

In particular, the third fluid tube 90 is a fluid tube configured to return the return fluid to the input port of the first control valve 20B (the first input port 42a and the second input port 42b), the return fluid being discharged from the first output port 43a of the first control valve 20B and flowing through the external fluid tube 81b.

For example, when the first control valve 20B is in the second position 20b2, which is one of the side positions, the third fluid tube 90 is a fluid tube connecting the third output port 43c of the first control valve 20B to the third input port 42c of the first control valve 20B.

In other words, in the case where the first control valve 20B is in the second position 20b2, the third fluid tube 90 and the second fluid tube 72 are connected to each other. It is preferred that the third fluid tube 90 is provided with a throttle portion 91 configured to reduce the flow rate of the operation fluid.

As described above, when the first control valve 20B is set to the second position 20b2 that is the side position, the supply fluid is supplied to the second input port 42b, and the supply fluid passes through the second connection fluid tube 22b and is supplied to the first hydraulic actuator 17.

On the other hand, when the first control valve 20B is set to the second position 20b2, the return fluid discharged from the second port 17e of the first hydraulic actuator 17 passes through the internal fluid tube 81a and the external fluid tube 81b, and flows toward the second control valve 20C.

Consider the following case where the return fluid passes through the first fluid tube 81, the auxiliary control valve 20C is switched to the first position 20c1 or to the second position 20c2, and thereby the hydraulic actuator 16 fails to be operated due to an external force, the hydraulic actuator 16 fails to be operated when the hydraulic actuator 16 constituted of a hydraulic cylinder reaches an end portion (an end) of the hydraulic cylinder, the supplying of the operation fluid is stopped, or the like under a condition where the hydraulic actuator 16 of the auxiliary attachment is in operation.

In other words, a case will be considered where the return fluid passes through the first fluid tube 81 and no hydraulic fluid is introduced into the first input port 44a and the second input port 44b of the auxiliary control valve 20C.

Under such states, since the return fluid in the first fluid tube 81 has no way to flow in the case where the third fluid tube 90 is not provided to the first control valve 20B, a pressure on the bottom side of the first hydraulic actuator 17 communicated with the first fluid tube 81 is increased. When the pressure on the bottom side of the first hydraulic actuator 17 is increased, a pressure on the rod side of the first hydraulic actuator 17 is also increased.

When the cross sectional areas on the bottom side and on the rod side are compared with each other inside the first hydraulic actuator 17, the sectional area on the bottom side is larger than the cross sectional area on the rod side. As the result, when the first hydraulic actuator 17 is stretched due to the pressure increasing on the bottom side of the first hydraulic actuator 17, the pressure increasing on the rod side will be relatively large.

For example, when the above-described situation occurs in the case where the first hydraulic actuator 17 and the third hydraulic actuator 14 are operated in combination, the operation of the first hydraulic actuator 17 may be delayed.

On the other hand, when the operation fluid is not introduced into the first input port 44a and the second input port 44b of the auxiliary control valve 20C in the case where the third fluid tube 90 is employed, the return fluid in the first fluid tube 81 flows to the second fluid tube 72 through the connecting portion 93. The return fluid flowing to the second fluid tube 72 returns to the input port (the first input port 42a and the second input port 42b) through the connecting portion 63.

In this manner, the return fluid in the first fluid tube 81 returns to the first control valve 20B again through the second fluid tube 72 and the third fluid tube 90, and thus the first hydraulic actuator 17 can be operated smoothly.

That is, since the return fluid on the rod side of the first hydraulic actuator 17 can be returned to the bottom side of the first hydraulic actuator 17, a speed of the stretching of the first hydraulic actuator 17 can be improved.

In particular, in a case where the first hydraulic actuator (the bucket cylinder) 17 and the third hydraulic actuator (the boom cylinder) 14 are operated in combination, for example, in a case where the boom cylinder 17 is stretched and the bucket cylinder 14 is stretched (in the case where the bucket cylinder 14 is operated in the dumping manner with moving the boom 14 upward), the dumping of the bucket 11 can be performed quickly.

As shown in FIG. 5, the hydraulic system of the working machine may be provided with a discharge fluid tube 70 branched off from the internal fluid tube 61c. The internal fluid tube 61c is a fluid tube configured to connect the first port 31 to the second output port 41b when the third control valve 20A is in the first position 20a1. The discharge fluid tube 70 is a fluid tube configured to be communicated with the first discharge port 33a in the case where the first control valve 20A is in the first position 20a1.

The discharge fluid tube 70 is provided with a throttle portion 71 configured to reduce the flow rate of the operation fluid. The throttle portion 71 is constituted, for example, by making a part of the discharge fluid tube 70 narrower than the other portions of the discharge fluid tube 70. In other words, the throttle portion 71 constituted by making the cross-sectional area of a portion through which the operation fluid flows smaller than the other portions in the discharge fluid tube 70.

Thus, since a part of the return fluid is discharged by the discharge fluid tube 70, the third hydraulic actuator 14 can be smoothly operated. Meanwhile, the configuration of the throttle portion 71 is not limited to the example described above.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

In the embodiment described above, the operation fluid is discharged to the operation fluid tank, but the operation fluid may be discharged to other components. That is, the fluid tube configured to discharge the hydraulic fluid may be connected to a portion other than the operation fluid tank, for example, the fluid tube may be connected to a suction portion of the hydraulic pump (a portion configured to suck the operation fluid), and the fluid tube may be connected to other portions.

In the embodiment described above, the control valve is a three-position switch valve. However, the number of switching positions is not limited, and the control valve may be constituted of a two-position switch valve, a four-position switch valve, or other switch valves. In the embodiment described above, the hydraulic pump is constituted of a constant-displacement pump. However, the hydraulic pump may be constituted of a variable displacement pump configured to move a swash plate to change a discharge amount, or may be constituted of another hydraulic pump, for example.

In addition, the first hydraulic actuator, the second hydraulic actuator, the third hydraulic actuator, the first control valve, the second control valve, and the third control valve are not limited to the examples of the embodiments described above, and it is only required to be provided in the working machine 1.

Figure 7:
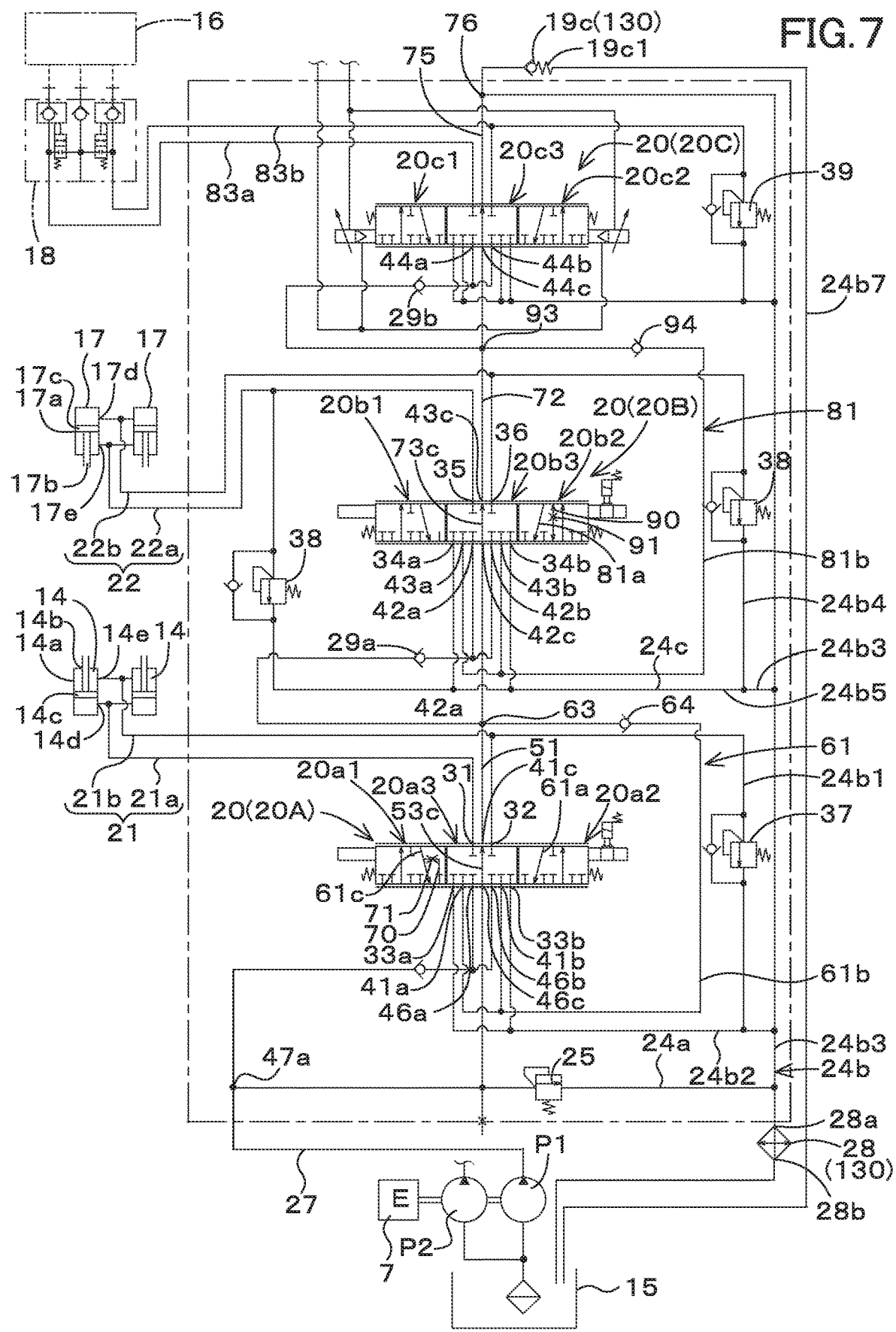
FIG. 7 is a view illustrating a modified example of the hydraulic system (the hydraulic circuit) of FIG. 5.

In addition, a pressure increasing portion 130 may be added to the hydraulic system for the working machine of FIG. 5. FIG. 7 is a hydraulic system in which the pressure increasing portion 130 is added to the hydraulic system for the working machine of FIG. 5.

The pressure increasing portion 130 is a portion configured to increase a pressure of the first fluid tube 81. In other words, the pressure increasing portion 130 increases the pressure of the fluid tube (a center fluid tube 75, the center fluid tube 72, the fluid tube 24b3, and the fluid tube 24b7) connected to the first fluid tube 81, and thereby increases the pressure of the first fluid tube 81.

The center fluid tube 75 is an fluid tube connected to the second control valve 20C and communicated with the center fluid tube 72. The center fluid tube 75 and the fluid tube 24b3 are confluent with each other at a confluent portion 76. The fluid tube 24b7 connects the confluent portion 76, the hydraulic fluid tank 15, and the like to each other.

The pressure increasing portion 130 includes the check valve 19c, an oil cooler 28, and the like. Meanwhile, the pressure increasing portion 130 may be constituted of anything as long as it increases the pressure of the discharge fluid tube 24b, and may be constituted of a relief valve, a throttle portion (a throttle valve), or a choke valve.

In particular, the check valve 19c is connected to an intermediate portion of the fluid tube 24b7 of the discharge fluid tube 24b. The check valve 19c is a valve configured to allow the hydraulic fluid to flow toward the hydraulic fluid tank 15 and to prevent the hydraulic fluid from flowing toward the center fluid tube 75. The check valve 19c has a setting member 19c1 configured to set a differential pressure.

The setting member 19cl is constituted of a spring or the like. The setting member 19c1 pushes the valve body with a predetermined pushing force from a side opposed to the direction permitting the flow of the hydraulic fluid (a blocking direction), and thereby generates the differential pressure. According to the check valve 19c, it is possible to increase the pressure of the hydraulic fluid on the upstream side of the fluid tube 24b7 from the inlet side of the check valve 19c to the confluent portion 76.

Thus, in the case where the first control valve 20B is set to the second position 20b2, the pressures of the hydraulic fluids in the center fluid tube 75 and the center fluid tube 72 can be increased by the check valve 19c. In this manner, the entire pressure of the first fluid tube 81 connected to the center fluid tube 72 through the confluent portion 93 can be increased.

That is, since the pressure of the first fluid tube 81 through which the return fluid flows can be increased, it is possible to facilitate the return fluid applied to the center fluid tube 72 through the confluent portion 93 to easily flow into the third fluid tube 90.

The oil cooler 28 is provided in the middle portion of the discharge fluid tube 24b. The operation fluid discharged from the discharge fluid tube 24b3 flows into the inlet port 28a of the oil cooler 28. The discharge port 28b, which is different from the inlet port 28a of the oil cooler 28, is connected to the hydraulic fluid tank 15.

Thus, in the case where the first control valve 20B is set to the second position 20b2, the pressures of the hydraulic fluids in the center fluid tube 75 and the center fluid tube 72 can be increased also in the case of the oil cooler 28 as in the case of the check valve 19c.

As the result, the return fluid applied to the center fluid tube 72 through the confluent portion 93 is facilitated to easily flow into the third fluid tube 90. The return fluid that has passed through the third fluid tube 90 passes through the third input port 42c, passes through the confluent portion 63, and then is introduced into the first input port 42a and the second input port 42b.

Figure 8:
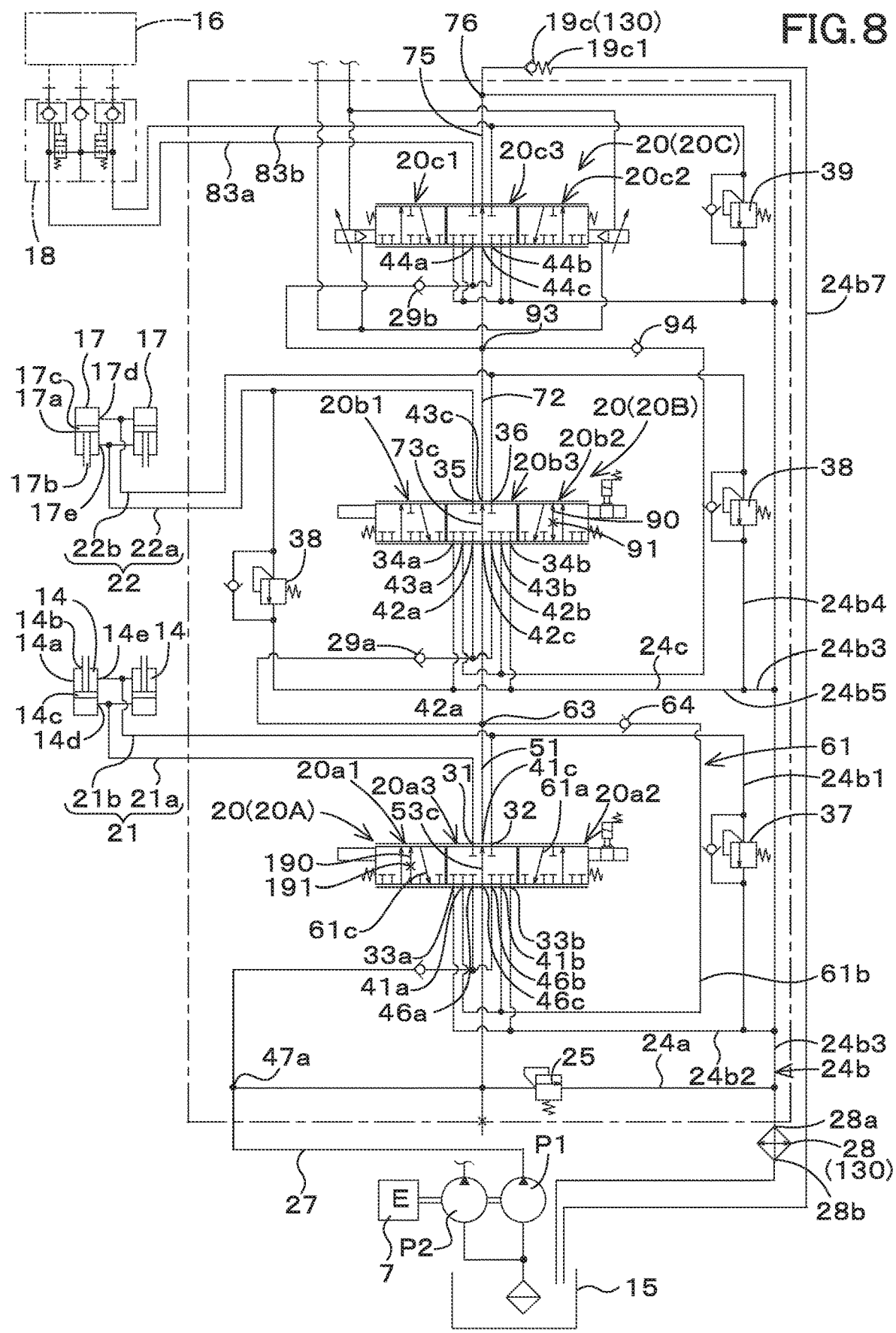
FIG. 8 a view illustrating a modified example of the hydraulic system (the hydraulic circuit) of FIG. 5.

FIG. 8 shows a modified example of the hydraulic system of the working machine shown in FIG. 5. In the modified example, the boom control valve 20A is the "first control valve", the bucket control valve 20B is the "second control valve", and the auxiliary control valve 20C is the "third control valve". In addition, the boom cylinder 14 is the "first hydraulic actuator", the bucket cylinder 17 is the "second hydraulic actuator", and the hydraulic actuator 16 of the auxiliary attachment is the "third hydraulic actuator".

In addition, in the modified example, the first fluid tube is the return fluid tube 61. That is, in the case of the modified example, the return fluid (a first fluid tube) 61 has a second connection fluid tube 21b, an inner fluid tube 61c, and an outer fluid tube 61b. The second fluid tube is the center fluid tube 51. The third fluid tube is the fluid tube 190.

The fluid tube (a third fluid tube) 190 is a fluid tube through which the return fluid is returned to the first control valve 20A again, the return fluid passing through the return fluid tube (a first fluid tube) 61 and flowing from the first control valve 20A to the second control valve 20B. In particular, the fluid tube 190 is a fluid tube through which the return fluid is returned to an input port (a first input port 46a) of the first control valve 20A, the return fluid being discharged from the second output port 41b of the first control valve 20A and flowing through the external fluid tube 61b.

For example, in the case where the first control valve 20A is in the first position 20a1 which is one of the lateral positions, the fluid tube 190 connects the third output port 41c of the first control valve 20A to the third input port 41c of the first control valve 20A. the third control valve 20<3 input port 46 c.

In other words, in the case where the first control valve 20A is in the first position 20a1, the fluid tube 190 and the center fluid tube (a second fluid tube) 51 are connected to each other. It is preferred that the fluid tube 190 is provided with the throttle portion 191 for reducing the flow rate of the operation fluid.

According to the above description, in the case where the first control valve 20A is set to the first position 20a1 which is the lateral position, the supply fluid is supplied to the first input port 46a, and the supply fluid passes through the first connection fluid tube 21a, and then is supplied to the first hydraulic actuator 14.

In addition, in the case where the first control valve 20A is set to the first position 20a1, the return fluid discharged from the second port 14e of the first hydraulic actuator 14 passes through the return fluid tube (a first fluid tube) 61, that is, the second connection fluid tube 21b, the internal fluid tube 61c, and the external fluid tube 61b, and flows toward the second control valve 20B.

After passing through the confluent portion 63, the return fluid flowing into the external fluid tube 61b flows into the center fluid tube (a second fluid tube) 51 and is introduced into the third input port 41c. The return fluid introduced into the third input port 41c flows to the fluid tube (a third fluid tube) 190, and returns to the input port (the first input port 46a). The return fluid returning to the input port (the first input port 46a) is introduced to the first input port 46a and the second input port 46b through the discharge fluid tube 27.

In this manner, the return fluid in the return fluid tube (a first fluid tube) 61 returns to the first control valve 20A again through the center fluid tube (a second fluid tube) 51 and the fluid tube (a third fluid tube) 190, and thus the first hydraulic actuator 14 can be operated smoothly.

In addition, in the hydraulic system the hydraulic circuit) including the pressure increasing portion 130, the third fluid tubes 90 and 190 may be provided to the control valve arranged on the most downstream side of the plurality of control valves 20 as described above.

What is claimed is:

1. A hydraulic system of a working machine comprising:
a hydraulic pump to output an operation fluid;
a first hydraulic device to be operated by the operation fluid;
a second hydraulic device other than the first hydraulic device, the second hydraulic device being configured to be operated by the operation fluid;
a first control valve to control the first hydraulic device;
a second control valve disposed on a downstream side of the first control valve and configured to control the second hydraulic device;
a first communication tube connecting the first hydraulic device to the first control valve, the first communication tube being configured to supply a return fluid that returns from the first hydraulic device to the first control valve;
a second communication tube other than the first communication tube, the second communication tube connecting the first hydraulic device to the first control valve and being configured to supply the return fluid that returns from the first hydraulic device to the first control valve;
a supply fluid tube connecting the first control valve to the second control valve, the supply fluid tube being configured to supply the return fluid to the second control valve;
a first connection fluid tube disposed in the first control valve, the first connection fluid tube connecting the first communication tube to the supply fluid tube;
a second connection fluid tube other than the first connection fluid tube, the second connection fluid tube being disposed in the first control valve and connecting the second communication tube to the supply fluid tube;
a discharge fluid tube connected to the first control valve;
a first branching fluid tube branched from the first connection fluid tube, the first branching fluid tube being connected to the discharge fluid tube;
a second branching fluid tube branched from the second connection fluid tube, the second branching fluid tube being connected to the discharge fluid tube;
a first throttle disposed in the first branching fluid tube; and
a second throttle disposed in the second branching fluid tube, the second throttle being smaller than the first throttle.

2. The hydraulic system according to claim 1,
wherein the first hydraulic device is hydraulic cylinder configured to be stretched and shortened, to discharge the return fluid to the first communication tube in the shortening of the first hydraulic device, and to discharge the return fluid to the second communication tube in the stretching of the first hydraulic device,
wherein the first connection fluid tube is connected to the first communication tube and supplies the return fluid that is discharged from the first communication tube,
wherein the supply fluid tube is connected to the first connection fluid tube and supplies the return fluid to the second control valve, the return fluid being discharged from the first connection fluid tube,
wherein the second connection fluid tube is connected to the second communication tube and supplies the return fluid that is discharged from the second communication tube,
and wherein the supply fluid tube is connected to the second connection fluid tube and supplies the return fluid to the second control valve, the return fluid being discharged from the second connection fluid tube.

3. The hydraulic system according to claim 1, comprising a check valve disposed in the discharge fluid tube, the check valve being configured to allow the operation fluid discharged from the first control valve to flow and configured to block the operation fluid from flowing toward the first control valve.

* * * * *